(12) United States Patent
Cai et al.

(10) Patent No.: US 10,983,350 B2
(45) Date of Patent: Apr. 20, 2021

(54) AUGMENTED/VIRTUAL REALITY NEAR-EYE DISPLAYS WITH EDGE IMAGING LENS COMPRISING A PLURALITY OF DISPLAY DEVICES

(71) Applicant: Ostendo Technologies, Inc., Carlsbad, CA (US)

(72) Inventors: Jingbo Cai, Carlsbad, CA (US); Hussein S. El-Ghoroury, Carlsbad, CA (US); Marty Maiers, Fallbrook, CA (US); Chih-Li Chuang, San Diego, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 0 days.

(21) Appl. No.: 16/505,163

(22) Filed: Jul. 8, 2019

(65) Prior Publication Data
US 2019/0331924 A1 Oct. 31, 2019

Related U.S. Application Data

(62) Division of application No. 15/477,712, filed on Apr. 3, 2017, now Pat. No. 10,353,203.
(Continued)

(51) Int. Cl.
*G02B 27/01* (2006.01)
(52) U.S. Cl.
CPC ..... *G02B 27/0172* (2013.01); *G02B 27/0176* (2013.01); *G02B 2027/011* (2013.01);
(Continued)

(58) Field of Classification Search
CPC .......... G02B 27/01; G02B 27/0101; G02B 27/0149; G02B 27/017; G02B 27/0172;
(Continued)

(56) References Cited

U.S. PATENT DOCUMENTS

| 4,427,912 A | 1/1984 | Bui et al. |
| 4,987,410 A | 1/1991 | Berman et al. |

(Continued)

FOREIGN PATENT DOCUMENTS

| CN | 103298410 | 9/2013 |
| CN | 103546181 | 1/2014 |

(Continued)

OTHER PUBLICATIONS

"International Search Report and Written Opinion of the International Searching Authority dated Apr. 19, 2017; International Application No. PCT/US2016/069042", Apr. 19, 2017.
(Continued)

*Primary Examiner* — Kristina M Deherrera
(74) *Attorney, Agent, or Firm* — Greg Caldwell, Esq.; W. Eric Boyd, Esq.

(57) ABSTRACT

A system for near-eye display applications. A lens is provided with a beam-splitting interface horizontally along the width of the lens. Two display devices per lens are provided and disposed on the perimeter surface of the lens opposing an overlapped, prismatic facet optics assembly which balances aberration introduced by the slight symmetry break in the lens.

13 Claims, 20 Drawing Sheets

Related U.S. Application Data

(60) Provisional application No. 62/318,468, filed on Apr. 5, 2016.

(52) U.S. Cl.
CPC ............... *G02B 2027/013* (2013.01); *G02B 2027/0118* (2013.01); *G02B 2027/0123* (2013.01); *G02B 2027/0132* (2013.01); *G02B 2027/0147* (2013.01); *G02B 2027/0178* (2013.01)

(58) Field of Classification Search
CPC ............ G02B 27/0176; G02B 27/0179; G06T 19/006; H04N 13/044; H04N 5/7491
USPC ............. 359/13–14, 618, 629–633; 345/7–9, 345/632–633; 348/113–120; 349/11
See application file for complete search history.

(56) References Cited

U.S. PATENT DOCUMENTS

| | | |
|---|---|---|
| 5,162,828 A | 11/1992 | Furness et al. |
| 5,368,042 A | 11/1994 | O'Neal et al. |
| 5,619,373 A | 4/1997 | Meyerhofer et al. |
| 5,696,521 A | 12/1997 | Robinson et al. |
| 5,818,359 A | 10/1998 | Beach |
| 5,886,822 A | 3/1999 | Spitzer |
| 5,986,811 A | 11/1999 | Wohlstadter |
| 6,128,003 A | 10/2000 | Smith et al. |
| 6,147,807 A | 11/2000 | Droessler et al. |
| 6,151,167 A | 11/2000 | Melville |
| 6,353,503 B1 | 3/2002 | Spitzer et al. |
| 6,433,907 B1 | 8/2002 | Lippert et al. |
| 6,456,438 B1 | 9/2002 | Lee et al. |
| 6,522,794 B1 | 2/2003 | Bischel et al. |
| 6,529,331 B2 | 3/2003 | Massof et al. |
| 6,666,825 B2 | 12/2003 | Smith et al. |
| 6,710,902 B2 | 3/2004 | Takeyama |
| 6,719,693 B2 | 4/2004 | Richard |
| 6,795,221 B1 | 9/2004 | Urey |
| 6,803,561 B2 | 10/2004 | Dunfield |
| 6,804,066 B1 | 10/2004 | Ha et al. |
| 6,829,095 B2 | 12/2004 | Amitai |
| 6,924,476 B2 | 8/2005 | Wine et al. |
| 6,937,221 B2 | 8/2005 | Lippert et al. |
| 6,984,208 B2 | 1/2006 | Zheng |
| 6,999,238 B2 | 2/2006 | Glebov et al. |
| 7,061,450 B2 | 6/2006 | Bright et al. |
| 7,071,594 B1 | 7/2006 | Yan et al. |
| 7,106,519 B2 | 9/2006 | Aizenberg et al. |
| 7,190,329 B2 | 3/2007 | Lewis et al. |
| 7,193,758 B2 | 3/2007 | Wiklof et al. |
| 7,209,271 B2 | 4/2007 | Lewis et al. |
| 7,215,475 B2 | 5/2007 | Woodgate et al. |
| 7,232,071 B2 | 6/2007 | Lewis et al. |
| 7,369,321 B1 | 5/2008 | Ren et al. |
| 7,482,730 B2 | 1/2009 | Davis et al. |
| 7,486,255 B2 | 2/2009 | Brown et al. |
| 7,545,571 B2 | 6/2009 | Garoutte et al. |
| 7,580,007 B2 | 8/2009 | Brown et al. |
| 7,619,807 B2 | 11/2009 | Baek et al. |
| 7,623,560 B2 | 11/2009 | El-Ghoroury et al. |
| 7,724,210 B2 | 5/2010 | Sprague et al. |
| 7,747,301 B2 | 6/2010 | Cheng et al. |
| 7,767,479 B2 | 8/2010 | El-Ghoroury et al. |
| 7,791,810 B2 | 9/2010 | Powell |
| 7,829,902 B2 | 11/2010 | El-Ghoroury et al. |
| 7,952,809 B2 | 5/2011 | Takai |
| 8,049,231 B2 | 11/2011 | El-Ghoroury et al. |
| 8,098,265 B2 | 1/2012 | El-Ghoroury et al. |
| 8,243,770 B2 | 8/2012 | El-Ghoroury et al. |
| 8,279,716 B1 | 10/2012 | Gossweiler, III et al. |
| 8,292,833 B2 | 10/2012 | Son et al. |
| 8,405,618 B2 | 3/2013 | Colgate et al. |
| 8,471,967 B2 | 6/2013 | Miao et al. |
| 8,477,425 B2 | 7/2013 | Border et al. |
| 8,482,859 B2 | 7/2013 | Border |
| 8,508,830 B1 | 8/2013 | Wang |
| 8,508,851 B2 | 8/2013 | Miao et al. |
| 8,510,244 B2 | 8/2013 | Carson et al. |
| 8,553,910 B1 | 10/2013 | Dong et al. |
| 8,567,960 B2 | 10/2013 | El-Ghoroury et al. |
| 8,619,049 B2 | 12/2013 | Harrison et al. |
| 8,725,842 B1 | 5/2014 | Al-Nasser |
| 8,743,145 B1 | 6/2014 | Price |
| 8,773,599 B2 | 7/2014 | Saeedi et al. |
| 8,854,724 B2 | 10/2014 | El-Ghoroury et al. |
| 8,928,969 B2 | 1/2015 | Alpaslan et al. |
| 8,975,713 B2 | 3/2015 | Sako et al. |
| 9,097,890 B2 | 8/2015 | Miller et al. |
| 9,110,504 B2 | 8/2015 | Lewis et al. |
| 9,134,535 B2 | 9/2015 | Dobschal et al. |
| 9,179,126 B2 | 11/2015 | El-Ghoroury et al. |
| 9,195,053 B2 | 11/2015 | El-Ghoroury et al. |
| 9,239,453 B2 | 1/2016 | Cheng et al. |
| 9,244,277 B2 | 1/2016 | Cheng et al. |
| 9,244,539 B2 | 1/2016 | Venable et al. |
| 9,274,608 B2 | 3/2016 | Katz et al. |
| 9,286,730 B2 | 3/2016 | Bar-Zeev et al. |
| 9,529,191 B2 | 12/2016 | Sverdrup et al. |
| 9,538,182 B2 | 1/2017 | Mishourovsky et al. |
| 9,681,069 B2 | 6/2017 | El-Ghoroury et al. |
| 9,712,764 B2 | 7/2017 | El-Ghoroury et al. |
| 9,774,800 B2 | 9/2017 | El-Ghoroury et al. |
| 9,779,515 B2 | 10/2017 | El-Ghoroury et al. |
| 9,965,982 B2 | 5/2018 | Lapstun |
| 2002/0008854 A1 | 1/2002 | Leigh Travis |
| 2002/0017567 A1 | 2/2002 | Connolly et al. |
| 2002/0024495 A1 | 2/2002 | Lippert et al. |
| 2002/0075232 A1 | 6/2002 | Daum et al. |
| 2002/0083164 A1 | 6/2002 | Katayama et al. |
| 2002/0141026 A1 | 10/2002 | Wiklof et al. |
| 2002/0158814 A1 | 10/2002 | Bright et al. |
| 2002/0181115 A1 | 12/2002 | Massof et al. |
| 2002/0194005 A1 | 12/2002 | Lahr |
| 2003/0032884 A1 | 2/2003 | Smith et al. |
| 2003/0086135 A1 | 5/2003 | Takeyama |
| 2003/0122066 A1 | 7/2003 | Dunfield |
| 2003/0138130 A1 | 7/2003 | Cohen et al. |
| 2003/0184575 A1 | 10/2003 | Reho et al. |
| 2003/0187357 A1 | 10/2003 | Richard |
| 2004/0004585 A1 | 1/2004 | Brown et al. |
| 2004/0024312 A1 | 2/2004 | Zheng |
| 2004/0051392 A1 | 3/2004 | Badarneh |
| 2004/0080807 A1 | 4/2004 | Chen et al. |
| 2004/0080938 A1 | 4/2004 | Holman et al. |
| 2004/0085261 A1 | 5/2004 | Lewis et al. |
| 2004/0119004 A1 | 6/2004 | Wine et al. |
| 2004/0125076 A1 | 7/2004 | Green |
| 2004/0138935 A1 | 7/2004 | Johnson et al. |
| 2004/0179254 A1 | 9/2004 | Lewis et al. |
| 2004/0240064 A1 | 12/2004 | Dutta |
| 2005/0002074 A1 | 1/2005 | McPheters et al. |
| 2005/0024730 A1 | 2/2005 | Aizenberg et al. |
| 2005/0053192 A1 | 3/2005 | Sukovic et al. |
| 2005/0116038 A1 | 6/2005 | Lewis et al. |
| 2005/0117195 A1 | 6/2005 | Glebov et al. |
| 2005/0168700 A1 | 8/2005 | Berg et al. |
| 2005/0179976 A1 | 8/2005 | Davis et al. |
| 2005/0264502 A1 | 12/2005 | Sprague et al. |
| 2006/0017655 A1 | 1/2006 | Brown et al. |
| 2006/0132383 A1 | 6/2006 | Gally et al. |
| 2006/0152812 A1 | 7/2006 | Woodgate et al. |
| 2006/0253007 A1 | 11/2006 | Cheng et al. |
| 2006/0285192 A1 | 12/2006 | Yang |
| 2006/0290663 A1 | 12/2006 | Mitchell |
| 2007/0052694 A1 | 3/2007 | Holmes |
| 2007/0083120 A1 | 4/2007 | Cain et al. |
| 2007/0236450 A1 | 10/2007 | Colgate et al. |
| 2007/0269432 A1 | 11/2007 | Nakamura et al. |
| 2007/0276658 A1 | 11/2007 | Douglass |
| 2008/0002262 A1 | 1/2008 | Chirieleison |
| 2008/0049291 A1 | 2/2008 | Baek et al. |
| 2008/0130069 A1 | 6/2008 | Cernasov |

(56) References Cited

U.S. PATENT DOCUMENTS

| | | |
|---|---|---|
| 2008/0141316 A1 | 6/2008 | Igoe et al. |
| 2008/0239452 A1 | 10/2008 | Xu et al. |
| 2009/0073559 A1 | 3/2009 | Woodgate et al. |
| 2009/0086170 A1 | 4/2009 | El-Ghoroury et al. |
| 2009/0096746 A1 | 4/2009 | Kruse et al. |
| 2009/0161191 A1 | 6/2009 | Powell |
| 2009/0199900 A1 | 8/2009 | Bita et al. |
| 2009/0222113 A1 | 9/2009 | Fuller et al. |
| 2009/0256287 A1 | 10/2009 | Fu et al. |
| 2009/0268303 A1 | 10/2009 | Takai |
| 2009/0278998 A1 | 11/2009 | El-Ghoroury et al. |
| 2009/0327171 A1 | 12/2009 | Tan et al. |
| 2010/0003777 A1 | 1/2010 | El-Ghoroury et al. |
| 2010/0026960 A1 | 2/2010 | Sprague |
| 2010/0046070 A1 | 2/2010 | Mukawa |
| 2010/0053164 A1 | 3/2010 | Imai et al. |
| 2010/0066921 A1 | 3/2010 | El-Ghoroury et al. |
| 2010/0091050 A1 | 4/2010 | El-Ghoroury et al. |
| 2010/0156676 A1 | 6/2010 | Mooring et al. |
| 2010/0157400 A1* | 6/2010 | Dimov .................. G02B 5/188 359/13 |
| 2010/0171922 A1 | 7/2010 | Sessner et al. |
| 2010/0199232 A1 | 8/2010 | Mistry et al. |
| 2010/0220042 A1 | 9/2010 | El-Ghoroury et al. |
| 2010/0241601 A1 | 9/2010 | Carson et al. |
| 2010/0245957 A1 | 9/2010 | Hudman et al. |
| 2010/0259472 A1 | 10/2010 | Radivojevic et al. |
| 2010/0267449 A1 | 10/2010 | Gagner et al. |
| 2011/0054360 A1 | 3/2011 | Son et al. |
| 2011/0115887 A1 | 5/2011 | Yoo et al. |
| 2011/0221659 A1 | 9/2011 | King, III et al. |
| 2011/0285666 A1 | 11/2011 | Poupyrev et al. |
| 2011/0285667 A1 | 11/2011 | Poupyrev et al. |
| 2012/0033113 A1 | 2/2012 | El-Ghoroury et al. |
| 2012/0075173 A1 | 3/2012 | Ashbrook et al. |
| 2012/0075196 A1 | 3/2012 | Ashbrook et al. |
| 2012/0105310 A1 | 5/2012 | Sverdrup et al. |
| 2012/0113097 A1 | 5/2012 | Nam et al. |
| 2012/0120498 A1 | 5/2012 | Harrison et al. |
| 2012/0143358 A1 | 6/2012 | Adams et al. |
| 2012/0154441 A1 | 6/2012 | Kim |
| 2012/0157203 A1 | 6/2012 | Latta et al. |
| 2012/0195461 A1 | 8/2012 | Lawrence Ashok Inigo |
| 2012/0212398 A1 | 8/2012 | Border et al. |
| 2012/0212399 A1 | 8/2012 | Border et al. |
| 2012/0218301 A1 | 8/2012 | Miller |
| 2012/0236201 A1 | 9/2012 | Larsen et al. |
| 2012/0249409 A1 | 10/2012 | Toney et al. |
| 2012/0249741 A1 | 10/2012 | Maciocci et al. |
| 2012/0288995 A1 | 11/2012 | El-Ghoroury et al. |
| 2012/0290943 A1 | 11/2012 | Toney et al. |
| 2012/0293402 A1 | 11/2012 | Harrison et al. |
| 2012/0299962 A1 | 11/2012 | White et al. |
| 2012/0319940 A1 | 12/2012 | Bress et al. |
| 2012/0320092 A1 | 12/2012 | Shin et al. |
| 2013/0016292 A1 | 1/2013 | Miao et al. |
| 2013/0021658 A1 | 1/2013 | Miao et al. |
| 2013/0027341 A1 | 1/2013 | Mastandrea |
| 2013/0041477 A1 | 2/2013 | Sikdar et al. |
| 2013/0050260 A1 | 2/2013 | Reitan |
| 2013/0080890 A1 | 3/2013 | Krishnamurthi |
| 2013/0083303 A1 | 4/2013 | Hoover et al. |
| 2013/0100362 A1 | 4/2013 | Saeedi et al. |
| 2013/0141895 A1 | 6/2013 | Alpaslan et al. |
| 2013/0162505 A1 | 6/2013 | Crocco et al. |
| 2013/0169536 A1 | 7/2013 | Wexler et al. |
| 2013/0176622 A1 | 7/2013 | Abrahamsson et al. |
| 2013/0187836 A1 | 7/2013 | Cheng et al. |
| 2013/0196757 A1 | 8/2013 | Latta et al. |
| 2013/0215516 A1 | 8/2013 | Dobschal et al. |
| 2013/0225999 A1 | 8/2013 | Banjanin et al. |
| 2013/0258451 A1 | 10/2013 | El-Ghoroury et al. |
| 2013/0271679 A1 | 10/2013 | Sakamoto et al. |
| 2013/0285174 A1 | 10/2013 | Sako et al. |
| 2013/0286053 A1 | 10/2013 | Fleck et al. |
| 2013/0286178 A1 | 10/2013 | Lewis et al. |
| 2013/0321581 A1 | 12/2013 | El-Ghoroury et al. |
| 2014/0009845 A1 | 1/2014 | Cheng et al. |
| 2014/0024132 A1 | 1/2014 | Jia et al. |
| 2014/0049417 A1 | 2/2014 | Abdurrahman et al. |
| 2014/0049983 A1 | 2/2014 | Nichol et al. |
| 2014/0055352 A1 | 2/2014 | David et al. |
| 2014/0055692 A1 | 2/2014 | Kroll et al. |
| 2014/0085177 A1 | 3/2014 | Lyons et al. |
| 2014/0091984 A1 | 4/2014 | Ashbrook et al. |
| 2014/0098018 A1 | 4/2014 | Kim et al. |
| 2014/0098067 A1 | 4/2014 | Yang et al. |
| 2014/0118252 A1 | 5/2014 | Kim et al. |
| 2014/0129207 A1 | 5/2014 | Bailey et al. |
| 2014/0139454 A1 | 5/2014 | Mistry et al. |
| 2014/0139576 A1 | 5/2014 | Costa et al. |
| 2014/0147035 A1 | 5/2014 | Ding et al. |
| 2014/0168062 A1 | 6/2014 | Katz et al. |
| 2014/0176417 A1 | 6/2014 | Young et al. |
| 2014/0185142 A1 | 7/2014 | Gupta et al. |
| 2014/0200496 A1 | 7/2014 | Hyde et al. |
| 2014/0232651 A1 | 8/2014 | Kress et al. |
| 2014/0292620 A1 | 10/2014 | Lapstun |
| 2014/0300869 A1 | 10/2014 | Hirsch et al. |
| 2014/0301662 A1 | 10/2014 | Justice et al. |
| 2014/0304646 A1 | 10/2014 | Rossmann |
| 2014/0340304 A1 | 11/2014 | Dewan et al. |
| 2015/0001987 A1 | 1/2015 | Masaki et al. |
| 2015/0033539 A1 | 2/2015 | El-Ghoroury et al. |
| 2015/0035832 A1 | 2/2015 | Sugden et al. |
| 2015/0054729 A1 | 2/2015 | Minnen et al. |
| 2015/0058102 A1 | 2/2015 | Christensen et al. |
| 2015/0125109 A1 | 5/2015 | Robbins et al. |
| 2015/0138086 A1 | 5/2015 | Underkoffler et al. |
| 2015/0148886 A1 | 5/2015 | Rao et al. |
| 2015/0193984 A1 | 7/2015 | Bar-Zeev et al. |
| 2015/0205126 A1 | 7/2015 | Schowengerdt |
| 2015/0220109 A1 | 8/2015 | von Badinski et al. |
| 2015/0235467 A1 | 8/2015 | Schowengerdt et al. |
| 2015/0277126 A1 | 10/2015 | Hirano et al. |
| 2015/0301256 A1 | 10/2015 | Takiguchi |
| 2015/0301383 A1 | 10/2015 | Kimura |
| 2015/0323990 A1 | 11/2015 | Maltz |
| 2015/0323998 A1 | 11/2015 | Kudekar et al. |
| 2015/0326842 A1 | 11/2015 | Huai |
| 2015/0381782 A1 | 12/2015 | Park |
| 2016/0018948 A1 | 1/2016 | Parvarandeh et al. |
| 2016/0026059 A1 | 1/2016 | Chung et al. |
| 2016/0028935 A1 | 1/2016 | El-Ghoroury et al. |
| 2016/0116738 A1 | 4/2016 | Osterhout |
| 2016/0182782 A1 | 6/2016 | El-Ghoroury et al. |
| 2016/0191765 A1 | 6/2016 | El-Ghoroury et al. |
| 2016/0191823 A1 | 6/2016 | El-Ghoroury et al. |
| 2016/0220232 A1 | 8/2016 | Takada et al. |
| 2016/0342151 A1 | 11/2016 | Dey, IV et al. |
| 2017/0065872 A1 | 3/2017 | Kelley |
| 2017/0069134 A1 | 3/2017 | Shapira et al. |
| 2017/0184776 A1 | 6/2017 | El-Ghoroury et al. |
| 2017/0236295 A1 | 8/2017 | El-Ghoroury |
| 2017/0261388 A1 | 9/2017 | Ma et al. |
| 2017/0310956 A1 | 10/2017 | Perdices-Gonzalez et al. |

FOREIGN PATENT DOCUMENTS

| | | |
|---|---|---|
| CN | 103558918 | 2/2014 |
| CN | 104460992 | 3/2015 |
| EP | 0431488 | 1/1996 |
| WO | WO-2014/124173 | 8/2014 |

OTHER PUBLICATIONS

"International Search Report and Written Opinion of the International Searching Authority dated Jun. 29, 2017; International Application No. PCT/US2017/026238", Jun. 29, 2017.

"Invitation to Pay Additional Fees dated Feb. 13, 2017; International Application No. PCT/US2016/069042", Feb. 13, 2017.

"Office Action dated Aug. 31, 2018; U.S. Appl. No. 15/391,583", Aug. 31, 2018.

(56) References Cited

OTHER PUBLICATIONS

"Office Action dated Mar. 5, 2018; U.S. Appl. No. 15/391,583", Mar. 5, 2018.

Ahumada, Jr., Albert J. et al., "Spatio-temporal discrimination model predicts temporal masking functions", Proceedings of SPIE—the International Society for Optical Engineering, Human vision and electronic imaging III, vol. 3299, 1998, 6 pp. total.

Beulen, Bart W. et al., "Toward Noninvasive Blood Pressure Assessment in Arteries by Using Ultrasound", Ultrasound in Medicine & Biology, vol. 37, No. 5, 2011, pp. 788-797.

Bickel, Bernd et al., "Capture and Modeling of Non-Linear Heterogeneous Soft Tissue", ACM Transactions on Graphics (TOG)—Proceedings of ACM SIGGRAPH 2009, vol. 28, Issue 3, Article No. 89, Aug. 2009, 9 pp. total.

Castellini, Claudio et al., "Using Ultrasound Images of the Forearm to Predict Finger Positions", IEEE Transactions on Neural Systems and Rehabilitation Engineering, vol. 20, No. 6, Nov. 2012, pp. 788-797.

Cobbold, Richard S., "Foundations of Biomedical Ultrasound", Oxford University Press, 2007, pp. 3-95.

Fattal, David et al., "A multi-directional backlight for a wide-angle, glasses-free three-dimensional display", Nature, vol. 495, Mar. 21, 2013, pp. 348-351.

Grossberg, Stephen et al., "Neural dynamics of saccadic and smooth pursuit eye movement coordination during visual tracking of unpredictably moving targets", Neural Networks, vol. 27, 2012, pp. 1-20.

Guo, Jing-Yi et al., "Dynamic monitoring of forearm muscles using one-dimensional sonomyography system", Journal of Rehabilitation Research & Development, vol. 45, No. 1, 2008, pp. 187-195.

Harrison, Chris et al., "Skinput: Appropriating the Body as an Input Surface", CHI '10 Proceedings of the SIGCHI Conference on Human Factors in Computing Systems, 2010, pp. 453-462.

Hsiao, Tzu-Yu et al., "Noninvasive Assessment of Laryngeal Phonation Function Using Color Doppler Ultrasound Imaging", Ultrasound in Med. & Biol., vol. 27, No. 8, 2001, pp. 1035-1040.

Hua, Hong et al., "A 3D integral imaging optical see-through head-mounted display", Optics Express, vol. 22, No. 11, May 28, 2014, pp. 13484-13491.

Keir, Peter J. et al., "Changes in geometry of the finger flexor tendons in the carpal tunnel with wrist posture and tendon load: an MRI study on normal wrists", Clinical Biomechanics, vol. 14, 1999, pp. 635-645.

Khuri-Yakub, Butrus T. et al., "Capacitive micromachined ultrasonic transducers for medical imaging and therapy", J. Micromech. Microeng., vol. 21, No. 5, May 2011, pp. 054004-054014.

Koutsouridis, G. G. et al., "Towards a Non-Invasive Ultrasound Pressure Assessment in Large Arteries", Technische Universiteit Eindhoven, University of Technology, Mate Poster Award 2010: 15th Annual Poster Contest, 2010, 1 page total.

Lanman, Douglas et al., "Near-Eye Light Field Displays", ACM Transactions on Graphics (TOC), vol. 32, Issue 6, Article 220, Nov. 2013, 27 pp. total.

Legros, M. et al., "Piezocomposite and CMUT Arrays Assessment Through In Vitro Imaging Performances", 2008 IEEE Ultrasonics Symposium, Nov. 2-5, 2008, pp. 1142-1145.

Martin, Joel R. et al., "Changes in the flexor digitorum profundus tendon geometry in the carpal tunnel due to force production and posture of metacarpophalangeal joint of the index finger: An MRI study", Clinical Biomechanics, vol. 28, 2013, pp. 157-163.

Martin, Joel R. et al., "Effects of the index finger position and force production on the flexor digitorum superficialis moment arms at the metacarpophalangeal joints—a magnetic resonance imaging study", Clinical Biomechanics, vol. 27, 2012, pp. 453-459.

Marwah, Kshitij et al., "Compressive Light Field Photography using Overcomplete Dictionaries and Optimized Projections", Proc. of SIGGRAPH 2013 (ACM Transactions on Graphics, 32, 4), 2013, 12 pp. total.

Mujibiya, Adiyan et al., "The Sound of Touch: On-body Touch and Gesture Sensing Based on Transdermal Ultrasound Propagation", ITS '13 Proceedings of the 2013 ACM international conference on Interactive tabletops and surfaces, Oct. 6-9, 2013, pp. 189-198.

Paclet, Florent et al., "Motor control theories improve biomechanical model of the hand for finger pressing tasks", Journal of Biomechanics, vol. 45, 2012, pp. 1246-1251.

Pinton, Gianmarco F. et al., "A Heterogeneous Nonlinear Attenuating Full-Wave Model of Ultrasound", IEEE Transactions on Ultrasonics, Ferroelectrics, and Frequency Control, vol. 56, No. 3, Mar. 2009, pp. 474-488.

Richard, William D. et al., "A scalable architecture for real-time synthetic-focus imaging", Ultrasonic Imaging, vol. 25, 2003, pp. 151-161.

Rolland, Jannick P. et al., "Dynamic focusing in head-mounted displays", Part of the IS&T/SPIE Conference on the Engineering Reality of Virtual Reality, SPIE vol. 3639, Jan. 1999, pp. 463-470.

Shi, Jun et al., "Feasibility of controlling prosthetic hand using sonomyography signal in real time: Preliminary study", Journal of Rehabilitation Research & Development, vol. 47, No. 2, 2010, pp. 87-97.

Sikdar, Siddhartha et al., "Novel Method for Predicting Dexterous Individual Finger Movements by Imaging Muscle Activity Using a Wearable Ultrasonic System", IEEE Transactions on Neural Systems and Rehabilitation Engineering, vol. 22, No. 1, Jan. 2014, pp. 69-76.

Sueda, Shinjiro et al., "Musculotendon Simulation for Hand Animation", ACM Transactions on Graphics (TOG)—Proceedings of ACM SIGGRAPH 2008, vol. 27 Issue 3, Article No. 83, vol. 27 Issue 3, Aug. 2008, 8 pp. total.

Szabo, Thomas L., "Diagnostic Ultrasound Imaging: Inside Out, Second Edition", Elsevier Inc., 2013, 829 pp. total.

Van Den Branden Lambrecht, Christian J., "A Working Spatio-Temporal Model of the Human Visual System for Image Restoration and Quality Assessment Applications", ICASSP—96, Conference Proceedings of the 1996 IEEE International Conference on Acoustics, Speech, and Signal Processing, May 1996, 4 pp. total.

Watson, Andrew B. et al., "Model of human visual-motion sensing", Journal of the Optical Society of America A, vol. 2, No. 2, Feb. 1985, pp. 322-342.

Watson, Andrew B. et al., "Model of visual contrast gain control and pattern masking", Journal of the Optical Society of America A, vol. 14, No. 9, Sep. 1997, pp. 2379-2391.

Watson, Andrew B., "The search for optimal visual stimuli", Vision Research, vol. 38, 1998, pp. 1619-1621.

Watson, Andrew B., "The Spatial Standard Observer: A Human Visual Model for Display Inspection", Society for Information Display, SID 06 Digest, Jun. 2006, pp. 1312-1315.

Watson, Andrew B., "Visual detection of spatial contrast patterns: Evaluation of five simple models", Optics Express, vol. 6, No. 1, Jan. 3, 2000, pp. 12-33.

Wikipedia, "List of refractive indices", https://en.wikipedia.org/wiki/List_of_refractive_indices, Dec. 7, 2003, 5 pp. total.

Williams III, T. W., "Progress on stabilizing and controlling powered upper-limb prostheses", Journal of Rehabilitation Research & Development, Guest Editorial, vol. 48, No. 6, 2011, pp. ix-xix.

Willis, Karl D. et al., "MotionBeam: A Metaphor for Character Interaction with Handheld Projectors", CHI '11 Proceedings of the SIGCHI Conference on Human Factors in Computing Systems, May 7-12, 2011, pp. 1031-1040.

Yun, Xiaoping et al., "Design, Implementation, and Experimental Results of a Quaternion-Based Kalman Filter for Human Body Motion Tracking", IEEE Transactions on Robotics, vol. 22, No. 6, Dec. 2006, pp. 1216-1227.

Zhang, Cha et al., "Maximum Likelihood Sound Source Localization and Beamforming for Directional Microphone Arrays in Distributed Meetings", IEEE Transactions on Multimedia, vol. 10, No. 3, Apr. 2008, pp. 538-548.

\* cited by examiner

AUGMENTED/VIRTUAL REALITY NEAR-EYE DISPLAYS WITH EDGE IMAGING LENS COMPRISING A PLURALITY OF DISPLAY DEVICES

CROSS-REFERENCE TO RELATED APPLICATIONS

This application is a divisional of U.S. patent application Ser. No. 15/477,712 filed Apr. 3, 2017, which claims the benefit of U.S. Provisional Patent Application No. 62/318,468, filed Apr. 5, 2016, the entireties of which are incorporated herein by reference.

FIELD

The present disclosure relates to wearable, near-eye displays with particular emphasis on see-through near-eye displays having high optical performance that are easy to fabricate, aesthetically pleasing, compact and lightweight enough to wear comfortably.

BACKGROUND

Progress in miniaturization and in the capability of electronic image display devices is a key enabling technology for compact and high performance near-eye displays (NEDs) which have been extensively researched in recent years in view of increasingly popular augmented reality (AR) applications.

A challenge in the design of NEDs for AR applications has been to make such a system truly "wearable". For this purpose, the NED system must present high quality virtual images, be comfortable to wear, and not look awkward in appearance. Further, the system must not impair the user's perception of real-world views and be sufficiently rugged for daily handling. All these requirements must be met under the constraints of low cost in mass production for wide adoption.

There are a number of prior art NEDs which attempt to meet the above requirements with varying degrees of success. See, for example, U.S. Pat. Nos. 5,696,521, 5,886,822 and 8,508,851B2 whose exemplary NEDs are shown in FIGS. 1-3 respectively. These prior art NEDs take advantage of a refractive and/or reflective system with rotationally-symmetrical optical surfaces which are simple to fabricate and have average image performance but are undesirably bulky and/or have an awkward appearance. To better fit near-eye displays into a smaller volume on a user's face, some prior art NEDs employ an off-axis optical architecture which is symmetrical but only about the horizontal plane. See, for example, U.S. Pat. Nos. 6,353,503B1, 6,710,902B2, 6,147,807 and 9,239,453B2 whose exemplary NEDs are shown in FIGS. 4-5 and 7-8. In these prior art NEDs, a tilted off-axis segment of a partially-reflective concave surface in front of a users' eye is used to image light from the display device and combine it with light from the real-world view. The "combiner" surface may be of a complex geometry such as toroidal or free-formed. It may also be a flat surface with micro-features. To balance optical aberrations that are introduced by such combiner elements, additional or other tilted/decentered and/or free-form optical surfaces are employed elsewhere in the system.

The resulting near-eye off-axis near-eye display system is undesirably difficult to fabricate and looks very different from ordinary eyeglasses and is often too bulky, thus not aesthetically pleasing from a consumer standpoint. For example, U.S. Pat. No. 9,134,535B2 discloses an exemplary NED as illustrated in FIG. 6 in which the virtual image is combined with the real-world view through an ophthalmic lens-shaped combiner. The combiner has many minute facet features on the curved front and back surfaces. Since these minute facets are made parallel to each over the curved surfaces in the transversal zone, no additional aberration is introduced as imaging light is "Total Internal Reflection"- or "TIR"-bounced over these facets before being ejected toward the eye. As a result, other imaging surfaces anterior to the combiner can have rotational symmetry and fewer optical aberrations. Unfortunately, these imaging surfaces are large in diameter due to the required increased optical path to the eye pupil as the light must be guided through multiple (TIR) bounces within the combiner. This in turn detracts from the appearance experience of the NED. Further, the discontinuity between the minute facets can cause artifacts in the information light and the real-world view. Also, the parallelism between the minute facets must typically be held to very tight tolerances due to the necessary multiple TIR bounces off of the facets.

Another challenge in the design of prior art near-eye display systems has been the need to increase the system's field of view (FOV) so more information can be presented to the user for an improved user experience.

Optically, the FOV of a near-eye display can be increased merely by increasing the image display device size while keeping the system effective focal length (EFL) and numerical aperture (NA) unchanged. The product of NA and EFL defines the radius of the NED exit pupil within which an unobstructed virtual image can be viewed. This approach leads to a more complex optical system due to the associated size increase of optical surfaces/components and the need for aberration control for an increased FOV. In spite of the trade-off between system complexity and virtual image resolution at the corner fields, the resulting near-eye display will still grow in size due to the larger image display device and larger optical surfaces/components that must be employed to avoid vignetting. This in turn makes the near-eye display less wearable due to its excessive bulkiness. A larger display device is also undesirably less power efficient and is more costly.

To increase the FOV of a near-eye display, another approach has been to divide the FOV into multiple zones and to cover each zone with a channel which uses a smaller image display device. This angular tiling method has the advantage of each channel being relatively compact and the growth of system volume is proportional to the number of channels and the extent of the FOV. Also, the use of a number of smaller display devices is more cost-effective than the use of a single large device. See, for example, U.S. Pat. No. 6,529,331B2, and U.S. Pat. No. 9,244,277B2.

FIG. 9 shows a prior art NED incorporating multiple channels used to expand the FOV as disclosed in U.S. Pat. No. 6,529,331B2. Each channel comprises a display device and covers a limited FOV which is stacked or tiled to cover a larger FOV. The exit pupil planes of the various channels are overlapped at a single point which is coincident with the eye front point. The eye clearance ("ec") distance from the exit pupil plane to the first optical surface of a channel is defined as the eye clearance of a channel while the ec' distance from the eye front plane to the nearest optical surface among all channels is defined as the eye clearance of the NED. FIG. 9 shows that ec must be greater than ec' due to the arc arrangement of all channels around the eye front point. The associated increased ec requires that each channel grow in size and thus the entire system becomes bulkier. To fit multiple channels together, complex boundary conditions must be addressed and met which in turn increases NED fabrication challenges. To avoid a visual perception of gaps in the tiled-up image, the eye front must be finely aligned with the common point of the exit pupil planes of all channels. This requirement often makes the near-eye display difficult to wear. Further, the location of the display devices is in front along the vision line and is often not easy to use in connection with an AR application.

FIG. 10 shows a prior art NED with multiple channels to expand a FOV as disclosed in U.S. Pat. No. 9,244,277B2. A prism with a free-form optical surface is employed in each channel to deliver light from a display device image to the eye pupil. The exit pupil plane of each channel is made to be coincident with the eye pupil plane. This feature avoids the reduction of ec' from that of ec for a single channel and makes the whole system generally more compact than that of U.S. Pat. No. 6,529,331B2. The location of the display device is also moved away from the forward vision line for the convenience of an AR application. To undo the distortion of the real-world view caused by the imaging prism, a matched free-form prism is added anterior. To combine various channels, the imaging prism tip of each channel is trimmed and then butted together with glue or is bonded in a molding operation. Due to the required inclusion of the matched prism, this form of prior art NED typically becomes bulkier. Further, there is typically a seam line where the different channels adjoin. These seam lines often create distortion in the real-world view of the NED. Also, the trimming operation often leads to field-dependent pupil vignetting in each channel with more vignetting for the central FOV than for the peripheral FOV. The vignetted pupils of various channels complement each other at the eye pupil plane due to the symmetrical arrangement of various channels. Such a complement in pupil vignetting typically minimizes the appearance of image gaps in the tiled image as the eye rotates but to work well, the eye must be closely aligned to maintain the symmetrical arrangement of various channels. This again typically leads to a requirement of tight eye alignment with the NED.

To increase the FOV of a NED, yet another prior art approach has been to divide the FOV into a number of zones and to cover each zone in a time sequence with light from a single display device. A smaller display device can be used in this approach which in turn typically makes the NED smaller. The imaged light from the display device is switched among different zones using switchable optics components. See, for example, U.S. Pub. No. US2015/0125109A1 and U.S. Pub. No. US2014/0232651A1.

FIGS. 11A and 11B show two switchable light paths in the prior art NED disclosed in U.S. Patent Pub. No. US2015/0125109A1 with the FOV tiled in time sequence based on a multi-layer planar waveguide with a switchable Bragg Diffraction Grating (SBDG). Light from the display device is collimated by optics disposed outside the layered waveguides before being coupled into the waveguide using an input diffraction grating. In the waveguide, the display light is coupled by TIR reflection and routed along various paths using grating pairs formed by non-output grating layers and output grating layers. In this prior art device, either the non-output or the output grating layer in each pair must be a SBDG. Each distinct path corresponds to a FOV tiling channel. The non-output grating layers may be input grating layers or light path folding grating layers. One of the advantages of such a system is the realization of a real-world view through a thin planar waveguide which acts as a flat eyeglass lens. Another advantage of this approach is the expansion of the eye box through multiple bounces off of the folding or output grating layers with a diffraction efficiency less than one (1). With the eye box expansion taken care of by the waveguide and embedded grating layers, the collimation optics anterior to the waveguide can have a relatively small exit pupil aperture and simpler architecture which helps the performance of the NED. The small exit pupil aperture of collimation optics make the collimation optics smaller, but it typically also matches the very small geometries of the waveguide. However, disadvantages of such a system often include: a) low optical efficiency due to the small aperture of the collimation optics anterior to the waveguide and the switching in time sequence; b) the high complexity of the SBDG system, its environmental susceptibility (temperature/pressure/stress) and endurance; c) grating-induced optical aberrations for which correction complicates the collimation optics architecture or lowers the system optical performance; d) restrictions in the achievable FOV imposed by the TIR and grating angular bandwidth; e) a large area on the planar waveguide is needed to accommodate various grating pairs to route the display light and to expand the eye box size; and; f) the near-eye display volume is increased by the required collimation optics attached to the waveguide.

FIG. 12 shows yet a further prior art NED with multiple channels used to expand the FOV as disclosed in U.S. Patent Pub. No. US2014/0232651A1. The system is based on time multiplexing with active components such as switchable mirrors or holographic optics. The display device and imaging optics are disposed in a straight line to simplify optics and reduce the aberration level. For the real-world view light path, the near-eye display acts like an optical plate and introduces no distortion. Since the FOV is stacked up with spatially-separated folding components, the optical path length for each channel varies greatly. This leads to the field-dependent vignetting at the eye pupil which undesirably varies from channel-to-channel. The near-eye display as a result has a relatively small eye box.

Another significant technical hurdle to the miniaturization of near-eye display systems is the availability of high brightness and compact display devices, as can be inferred from the above discussion. Common conventional display device technologies include Digital Micro-Mirror Display (DMD), Liquid Crystal Display (LCD), Liquid Crystal on Silicon (LCOS) and Organic Light Emitting Diode(OLED). Systems such as DMD and LCOS require an accompanying illumination optical system which adds system volume. LCD technology has associated low brightness and lower resolution. OLED technology is more compact than DMD and LCOS and has better brightness and resolution than LCD. OLED is also a promising display device format for near-eye displays, but OLED still needs to further improve its brightness and durability for wide adoption in NED applications.

A new class of emissive micro-scale pixel array imager devices has been introduced as disclosed in U.S. Pat. Nos. 7,623,560, 7,767,479, 7,829,902, 8,049,231, 8,243,770, 8,567,960, and 8,098,265, the contents of each of which is fully incorporated herein by reference. The disclosed light emitting structures and devices referred to herein may be based on the Quantum Photonic Imager or "QPI®" imager. QPI® is a registered trademark of Ostendo Technologies, Inc. These disclosed devices desirably feature high brightness, very fast multi-color light intensity and spatial modulation capabilities, all in a very small single device size that includes all necessary image processing drive circuitry. The solid-state light-(SSL) emitting pixels of the disclosed devices may be either a light emitting diode (LED) or laser diode (LD), or both, whose on-off state is controlled by drive circuitry contained within a CMOS chip (or device) upon which the emissive micro-scale pixel array of the imager is bonded and electronically coupled. The size of the pixels comprising the disclosed emissive arrays of such imager devices is typically in the range of approximately 5-20 microns with a typical emissive surface area being in the range of approximately 15-150 square millimeters. The pixels within the above emissive micro-scale pixel array devices are individually addressable spatially, chromatically and temporally, typically through the drive circuitry of its CMOS chip. The brightness of the light generated by such imager devices can reach multiple 100,000 cd/m2 at reasonably low power consumption.

The QPI imager referred to in the exemplary embodiments described below is well-suited for use in the wearable devices described herein. See U.S. Pat. Nos. 7,623,560, 7,767,479, 7,829,902, 8,049,231, 8,243,770, 8,567,960, and 8,098,265. However, it is to be understood that the QPI imagers are merely examples of the types of devices that may be used in the present disclosure. Thus, in the description to follow, references to the QPI imager, display, display device or imager are to be understood to be for purposes of specificity in the embodiments disclosed, and not for any limitation of the present disclosure.

BRIEF DESCRIPTION OF THE DRAWINGS

The embodiments herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

In the drawings.

DETAILED DESCRIPTION

Figure 1:
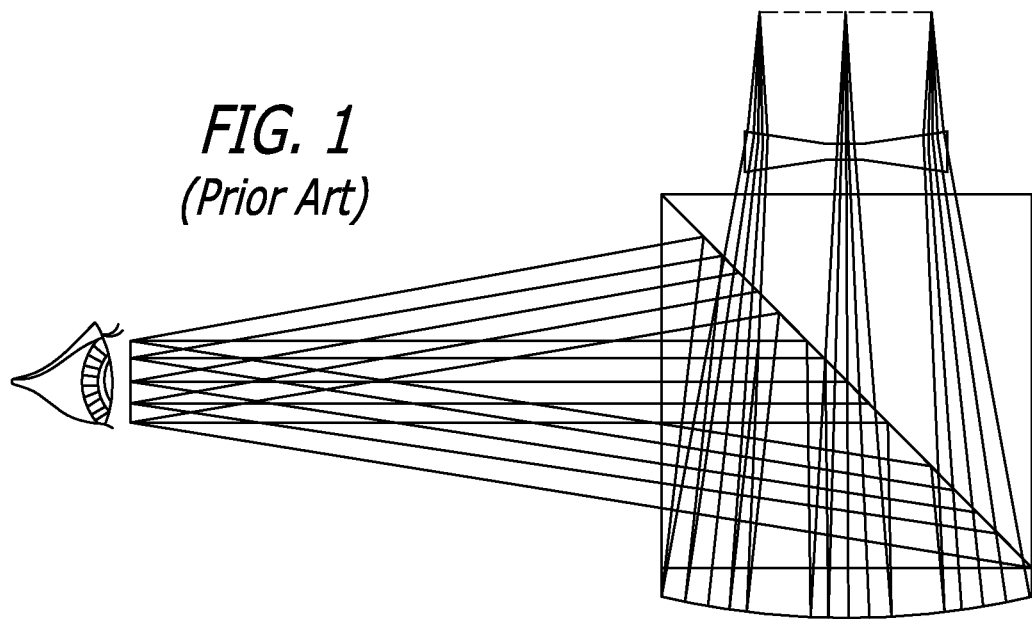
FIG. 1 is a prior art see-through near-eye display system.
Figure 2:
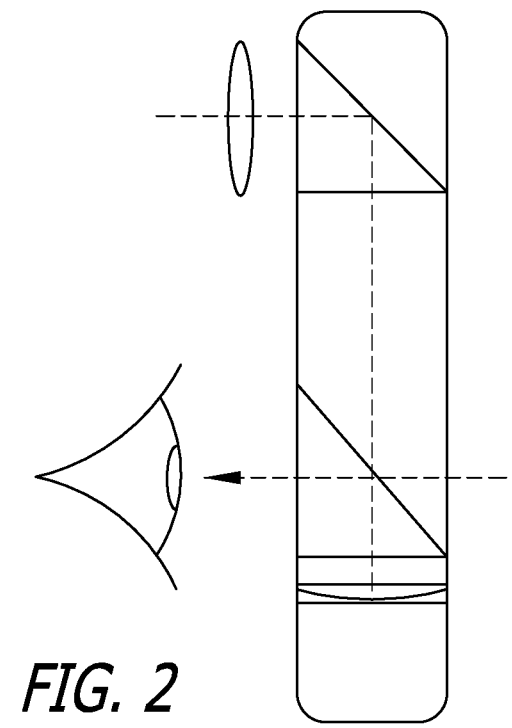
FIG. 2 is a further prior art see-through near-eye display system.
Figure 3:
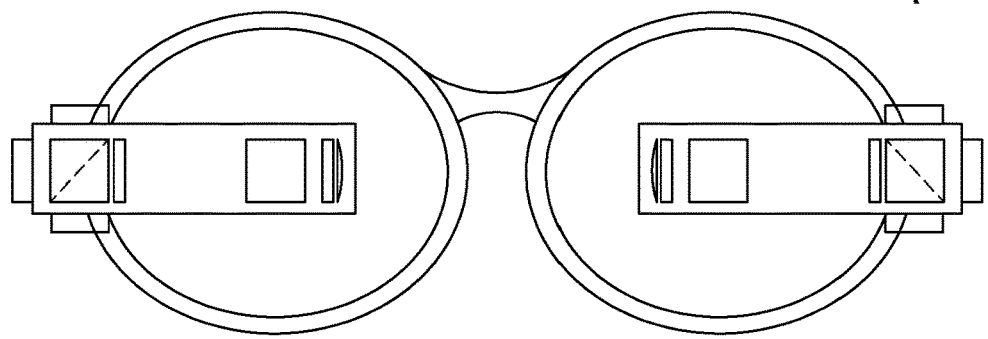
FIG. 3 is a yet further prior art see-through near-eye display system.
Figure 4:
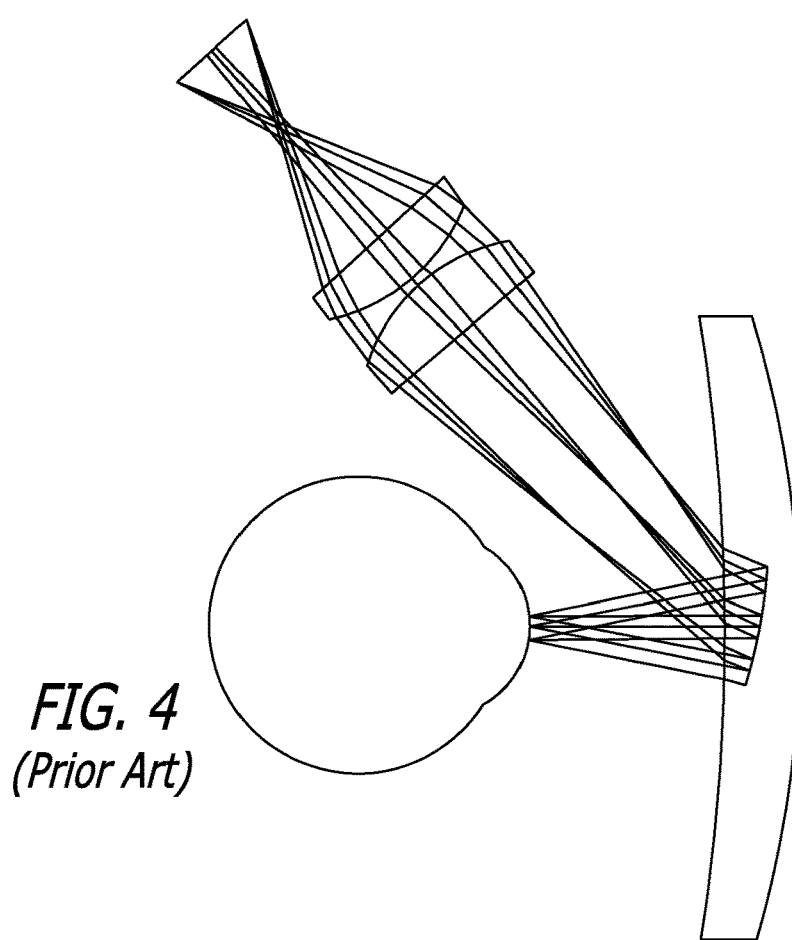
FIG. 4 is a yet further prior art see-through near-eye display system.
Figure 5:
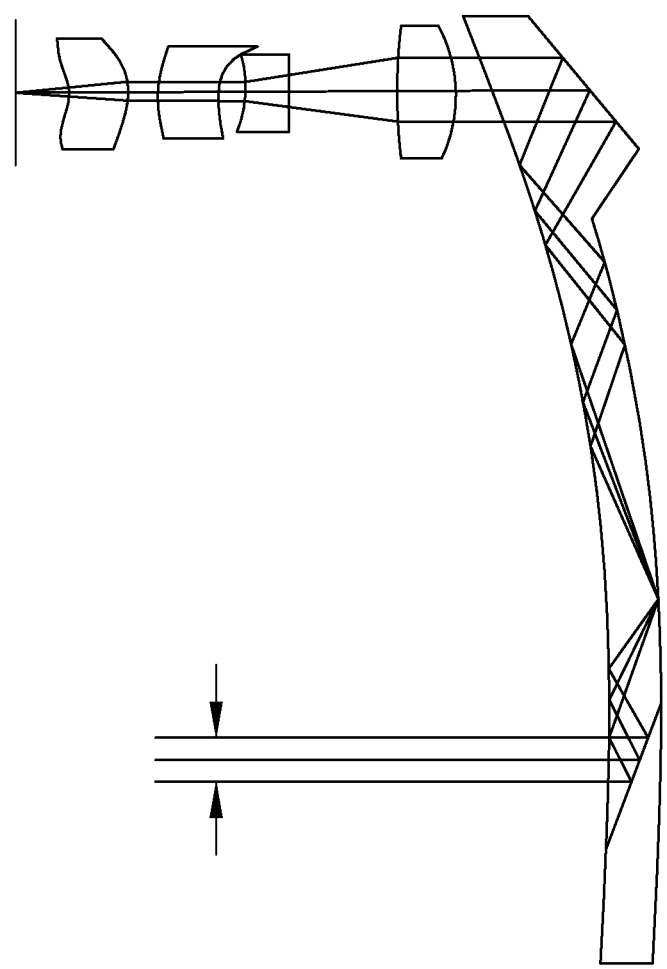
FIG. 5 is a yet further prior art see-through near-eye display system.
Figure 6:
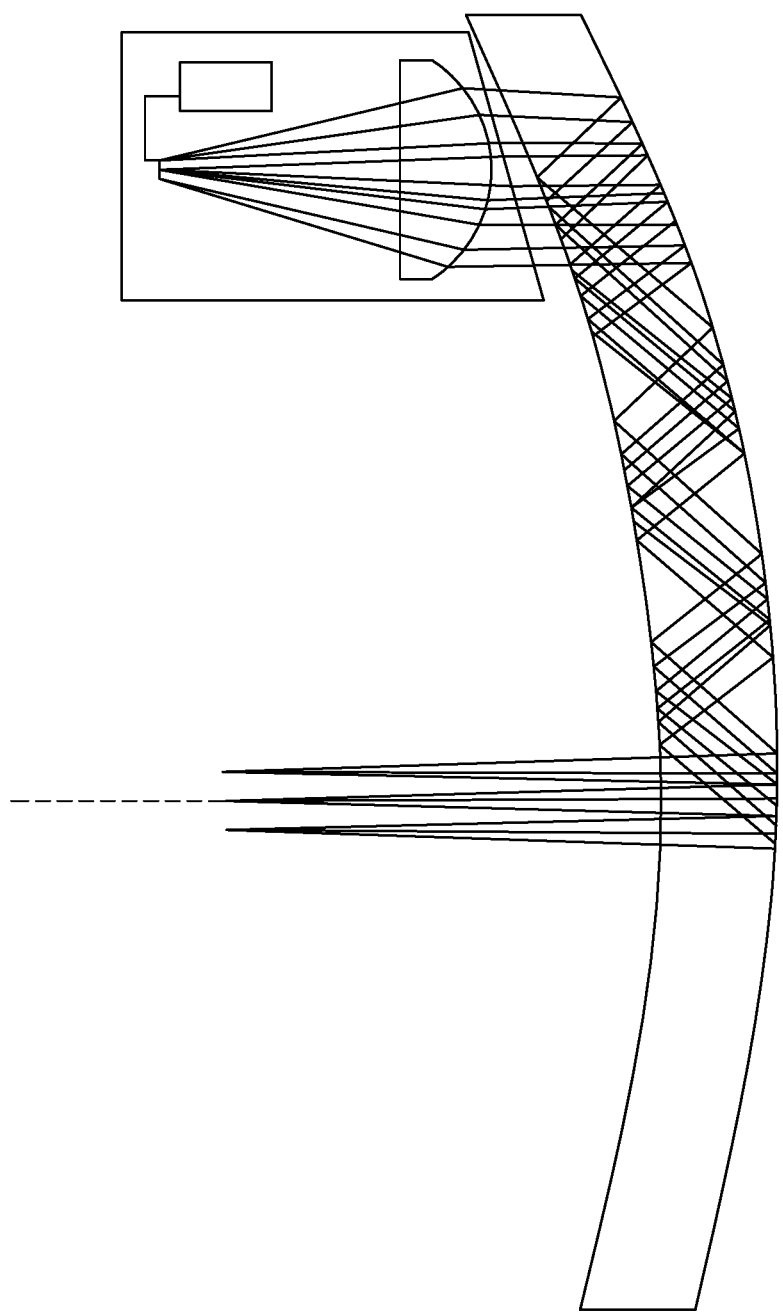
FIG. 6 is a yet further prior art see-through near-eye display system.
Figure 7:
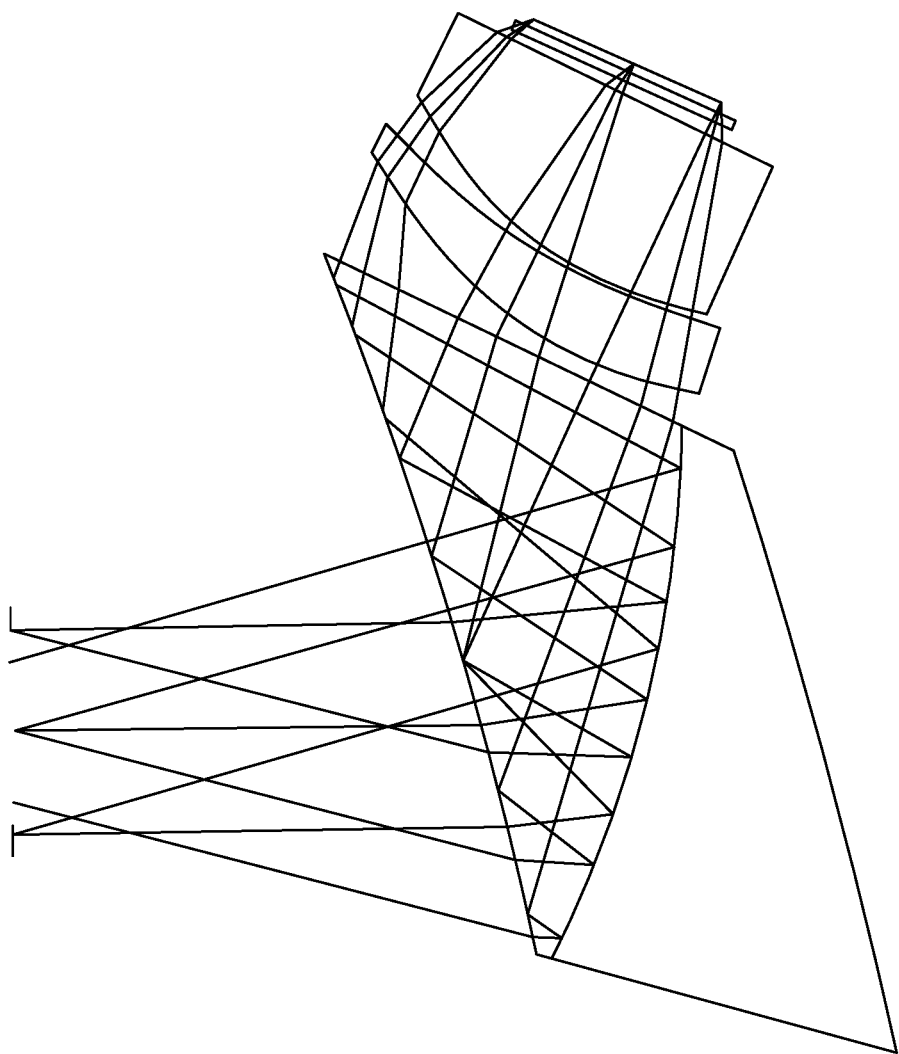
FIG. 7 is a yet further prior art see-through near-eye display system.
Figure 8:
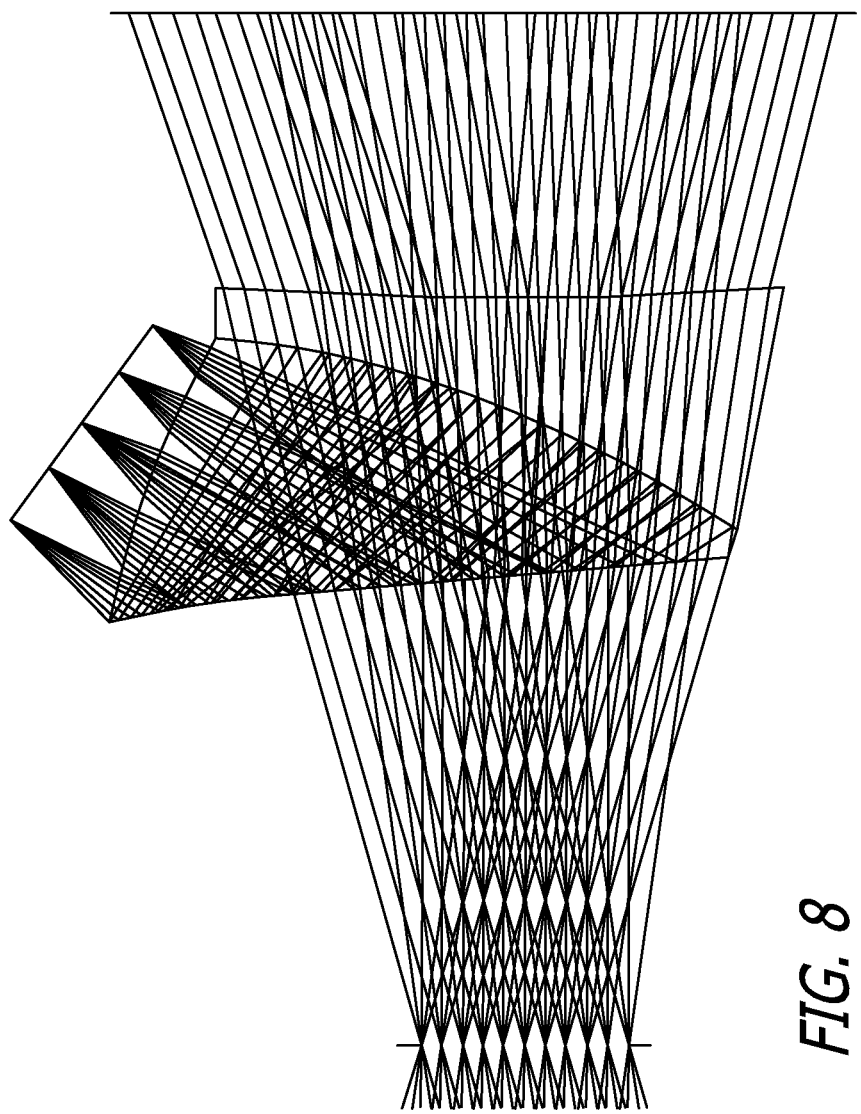
FIG. 8 is a yet further prior art see-through near-eye display system.
Figure 9:
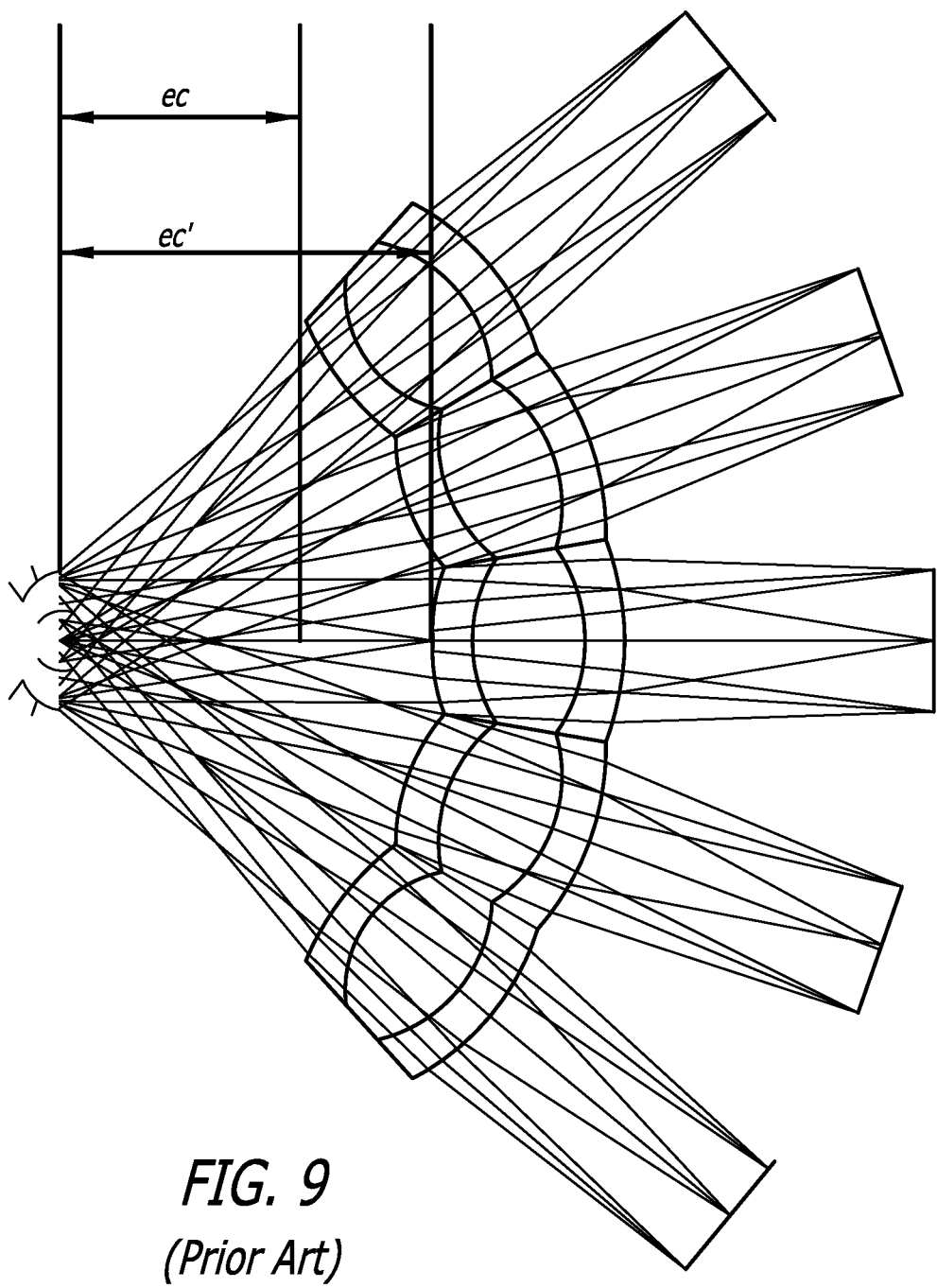
FIG. 9 is a prior art FOV tiling near-eye display system.
Figure 10:
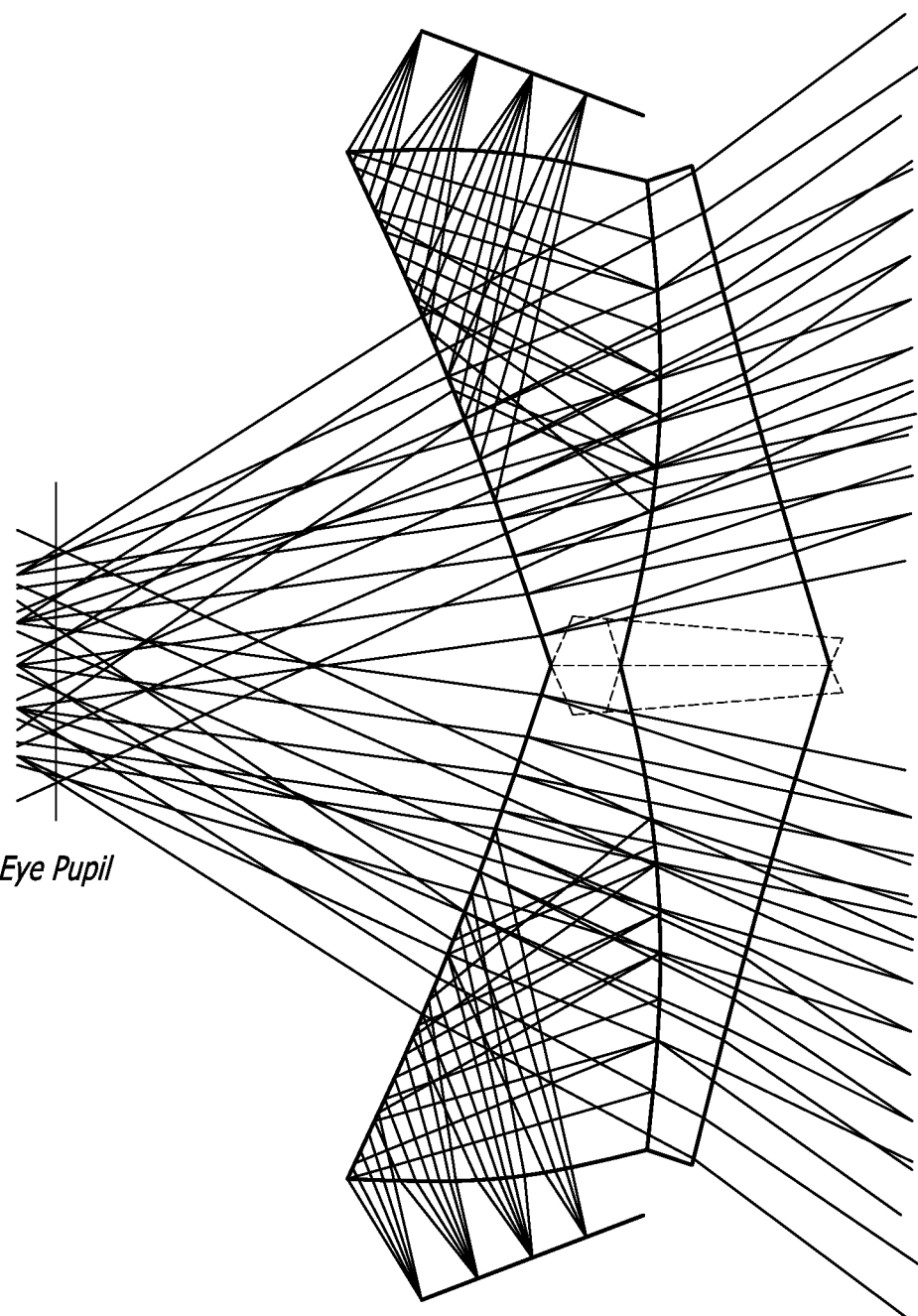
FIG. 10 is a yet further prior art FOV tiling see-through near-eye display system.
Figure 11A:
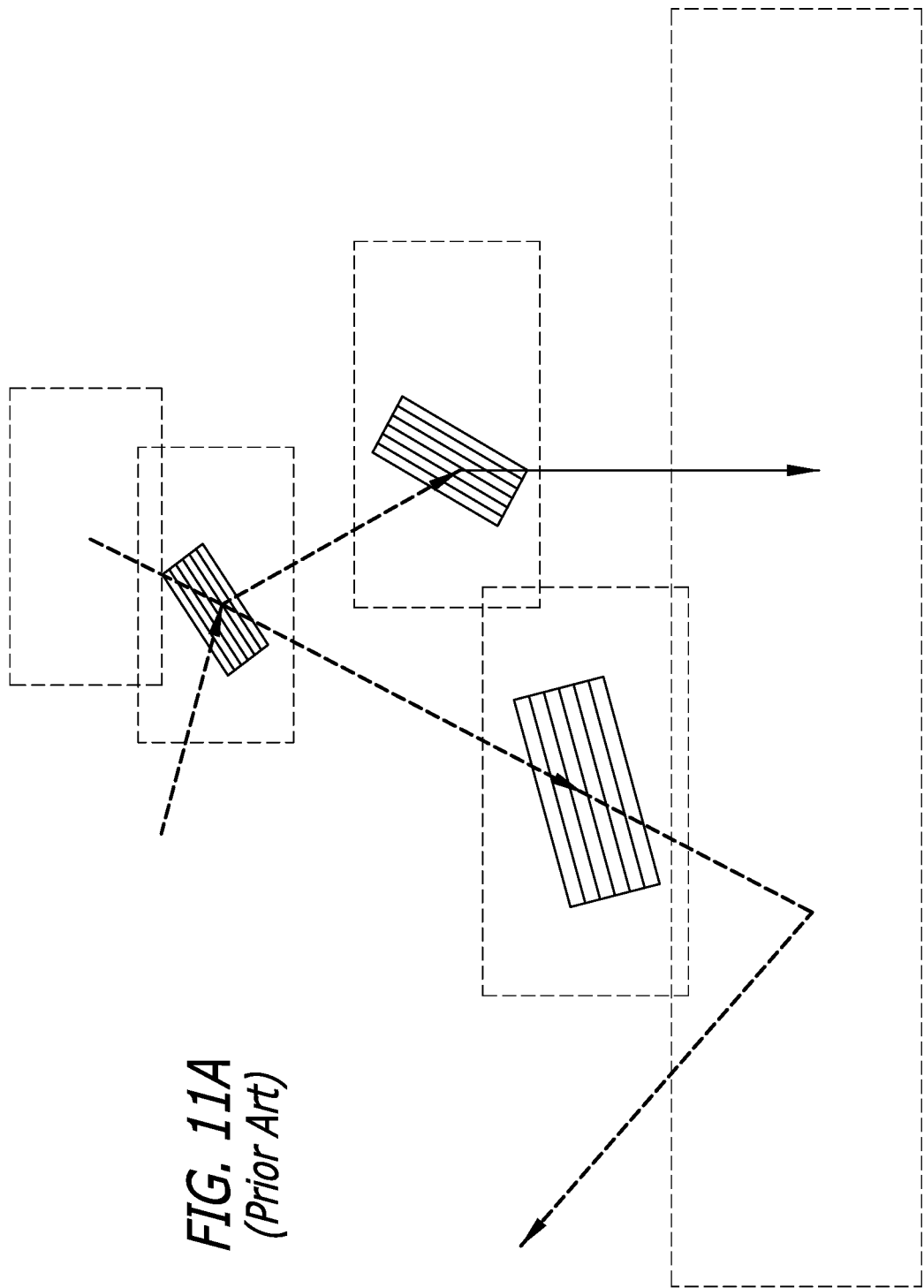
FIG. 11A shows one path in a prior art time sequence FOV tiling see-through near-eye display system.
Figure 11B:
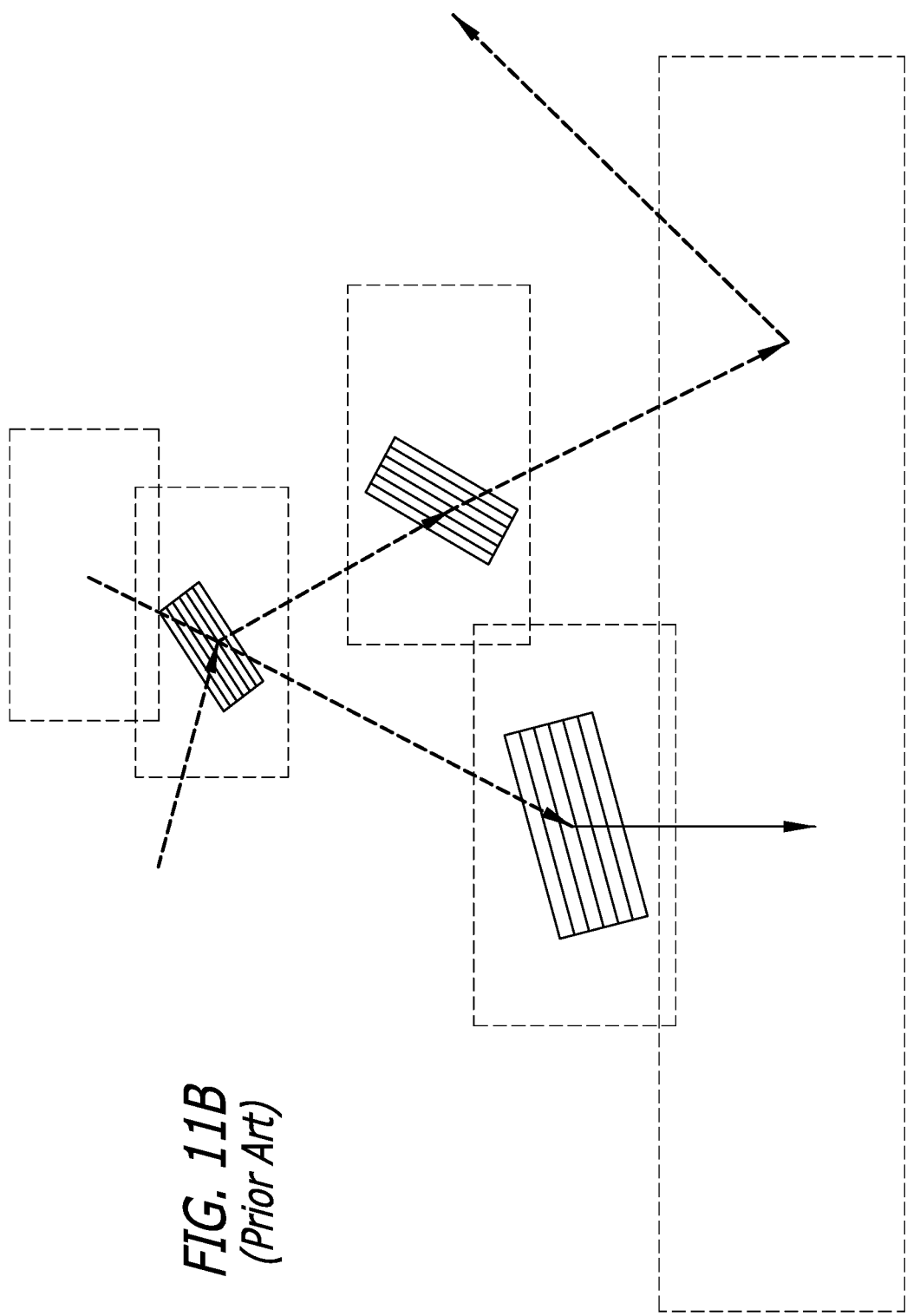
FIG. 11B shows a different path in the same near-eye display system as in FIG. 11A.
Figure 12:
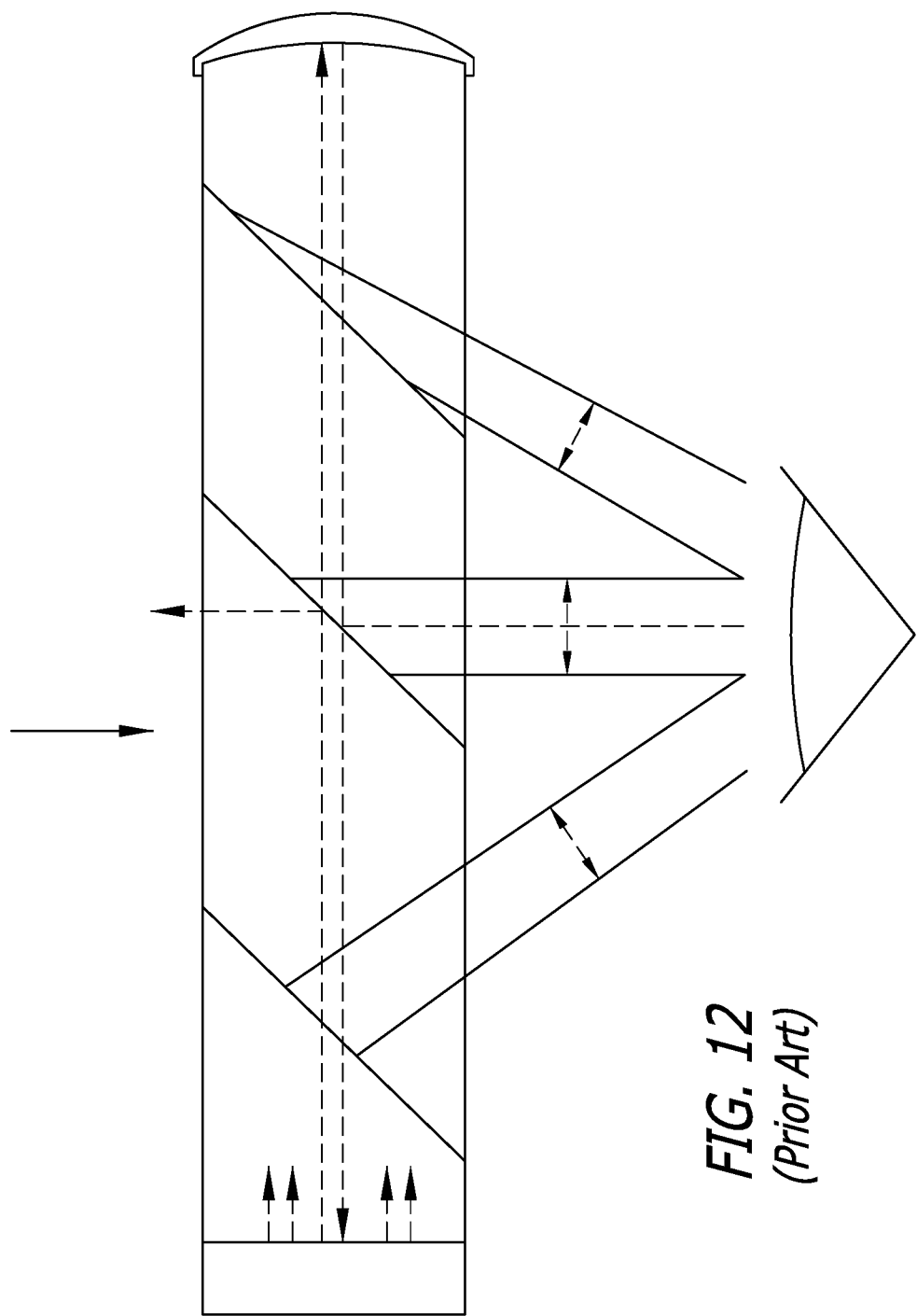
FIG. 12 is a yet further prior art time sequence FOV tiling see-through near-eye display system.

The present disclosure and various of its embodiments are set forth in the following description of the embodiments which are presented as illustrated examples of the disclosure in the subsequent claims. It is expressly noted that the disclosure as defined by such claims may be broader than the illustrated embodiments described below. The word "exemplary" is used herein to mean serving as an example, instance, or illustration. Any aspect or design described herein as "exemplary" is not necessarily to be construed as preferred or advantageous over other aspects or designs.

In one example embodiment, a near-eye display device is disclosed comprising a lens prism assembly comprising a viewer-facing surface, a scene-facing surface, a vertical dimension, a horizontal dimension and a lens thickness. The lens prism assembly may comprise an upper portion and a lower portion bonded together along a horizontal interface comprising a beam-splitting element. Two or more display devices may be disposed on a first edge surface and each configured to couple an optical image from the respective display devices through the lens thickness.

In one embodiment, a reflective element is disposed on a second edge surface that generally opposes the first surface. The reflective element, the beam-splitting element or both the reflective element and the beam-splitting element may comprise a region comprising a plurality of overlapping, prismatic facet elements that are configured to reflect or transmit the separate optical images (from the display devices) that overlap on the reflective element (i.e. areas where the two separate display device images overlap on the reflective element) in a predetermined interlaced optical pattern and back toward the beam-splitting element. The beam-splitting element may be further configured to couple the reflected optical images through the viewer-facing surface to an eye pupil of a user.

By virtue of the example embodiments herein, a compact NED is enabled that resembles the appearance of a pair of ordinary spectacle glasses (i.e., eyeglasses in the format of a typical consumer eyeglass frame), has good quality in both the displayed image and the "see-through" real-world view, is easy to fabricate in mass production and is comfortable to wear by accommodating large inter-pupil distance (IPD) variation among people.

The embodiments herein may be provided to take advantage of advances made in display device technologies, particularly self-emissive display devices with micro-pixels such as the Quantum Photonic Imager or "QPI®" imager. QPI® is a registered trademark of Ostendo Technologies, Inc. See U.S. Pat. Nos. 7,623,560, 7,767,479, 7,829,902, 8,049,231, 8,243,770, 8,567,960, and 8,098,265. Display devices such as the QPI imager offer high brightness and high resolution images in a very compact format and are particularly well-suited for the compact NED of present disclosure.

The embodiments herein may also take advantage of the ergonomic fact that, although humans' IPD varies greatly among the general population and users tend to scan their eyes in a large latitude to their left or to their right, a human's vertical eye scan movement is much narrower and less frequent. Humans generally tend to scan their vertical field of view by tilting their head back or forward. The embodiments herein exploit this behavior so that the disclosed NED does not require a circular eye box but rather provides an elongated eye box or exit pupil having a horizontal dimension that is larger than its vertical dimension. The eye box can be a 2-D or 3-D viewing region within which the viewer's eye can move and still see the entire image. The NED system may be vertically aligned with a user's eyes by adjusting the system up or down along the wearer's nose bridge like an ordinary pair of eyeglasses are worn and adjusted. Since much of the bulkiness of prior art NEDs comes from the requirement of having a large circular eye box, the reduction of eye box size in the vertical direction beneficially reduces system bulkiness in the corresponding horizontal (eye sight) direction which is the dominant eye-scan direction.

A conventional eyeglass or spectacle lens generally has its largest dimension along its width (horizontal) and the smallest dimension through its thickness with the height (vertical) dimension somewhere between the width and thickness dimension. The shape of the front (scene-facing) and the back (viewer-facing) of a spectacle lens is typically decided by the ophthalmic function or fashion. Thus, the lens edge surfaces may be modified to implement the function of coupling and reflecting an electronic image that is displayed from a display device to the eye pupil of a viewer. By disposing one or more display devices on the upper("first") or the lower("second") edge surface of a lens and coupling the image outputs from the display device(s) using a reflective optic assembly at the opposing edge surface, the larger lens horizontal dimension can correspond to the larger horizontal eye box dimension and the smaller lens vertical dimension can correspond to the smaller vertical eye box dimension.

By virtue of embodiments described herein, it is possible to simplify the light path from the display device to eye pupil and minimize any break of symmetry to ensure maximum optical performance. A lens suitable for an embodiment of the NED of the present disclosure may comprise a beam-splitting bonding interface embedded along the horizontal dimension of the lens, about mid-way along the lens' height dimension which divides the lens into two parts: an upper portion and a lower portion. The embedded interface can be provided with a partially-reflective coating whereby the interface functions as an optical beam-splitting element. In one embodiment, at least one, but preferably two or more, imaging source display devices such as QPI imagers are disposed on a first edge surface ("upper" in the described embodiment) facing the embedded beam-splitting interface and a novel reflective element surface, with or without optical power, is disposed on a second edge ("lower" in the described embodiment) facing the interface. It is expressly noted the above described embodiment is not limited to having the imager disposed on the first surface and the reflective element disposed on the second surface and that the terms "first" and "second" surfaces are used for convenience only and are considered interchangeable positions. For instance, disposing the imager on the second surface and the reflective element on the first surface are contemplated as being within the scope of the embodiments disclosed herein.

In one embodiment, a displayed image received from each of the display devices is coupled into the thickness of the lens body by optical transmission from the first edge. The information light transmits through the embedded partially-reflective interface and transverses the lens body along a straight path to the second edge upon which reflective element optics are disposed. Upon reflection from the reflective element disposed on the second edge, the information light travels back to the embedded partially-reflective interface. Upon reflection at the partially-reflective interface, information light transmits through the lens' viewer-facing surface and enters the eye pupil where it is perceived as a virtual image superimposed on the real-world view along the vision line.

In this optical path layout, much of the imaging work is performed by the edge reflective element optics which may be generally centered relative to the opposing display devices. The folding reflection at the embedded plane interface introduces little to no aberration. Although the spectacle lens viewer-facing surface is generally curved and tilted relative to the vision line for fashion or vision correction reasons, the aberration introduced at the viewer-facing surface is manageable due to the low divergence of information light at the surface and can be corrected at the reflective element or by clocking the display device and reflective element around the vision line as a group. Although the layout of the optical path of the information light of the present disclosure may be provided as a 3D path in nature, the break of symmetry is gentle with good optical performance attainable.

Another advantageous aspect of the present disclosure is the increase in horizontal field of view through the use of two QPI imagers or suitable display devices that are disposed on the first edge of the lens. In one embodiment, the total FOV may be divided into two tiled-up zones: a first zone and second zone with each zone supported by a single QPI imager. To ensure the complete overlap of light paths from these two zones over the eye box of NED, micro-prismatic facet features similar to those found in a Fresnel lens can be employed on the reflective element surface at the second edge of a lens and on the partially-reflective interface embedded in the thickness of the lens. These micro-prismatic facet features are categorized into two types with each type working with a respective display device. These two types of micro-prismatic facet features are interspersed at a period comparable to the micro-prismatic facet feature size. A typical size of the micro-prismatic facet feature may be about 20 to 150 um at which scale the light is reflected/refracted rather than diffracted. Thus, the wavelength dependence can be much less than that of diffracted elements. As a result, the eye box of the NED is composed of interspersed zones for different display devices at a pitch of 20 to 150 um. Since this pitch is much smaller than the typical 4 mm eye pupil of a user, a user's eyes can move over the entire eye box without image gaps being observed in the FOV. An advantageous effect of this embodiment is the compactness of the near-eye device and large effective eye box for the total FOV.

In one embodiment, a Fresnel slope angle is contoured along a closed circle of a Fresnel optical prismatic facet element to implement free-form optical surfaces which are useful in optical aberration correction.

The description of the various embodiments of the NED of the disclosure is made with regard to one lens or one eye but it is expressly noted that the description is intended to include two lenses or both eyes which together provides stereoscopic or binocular vision.

Figure 13:
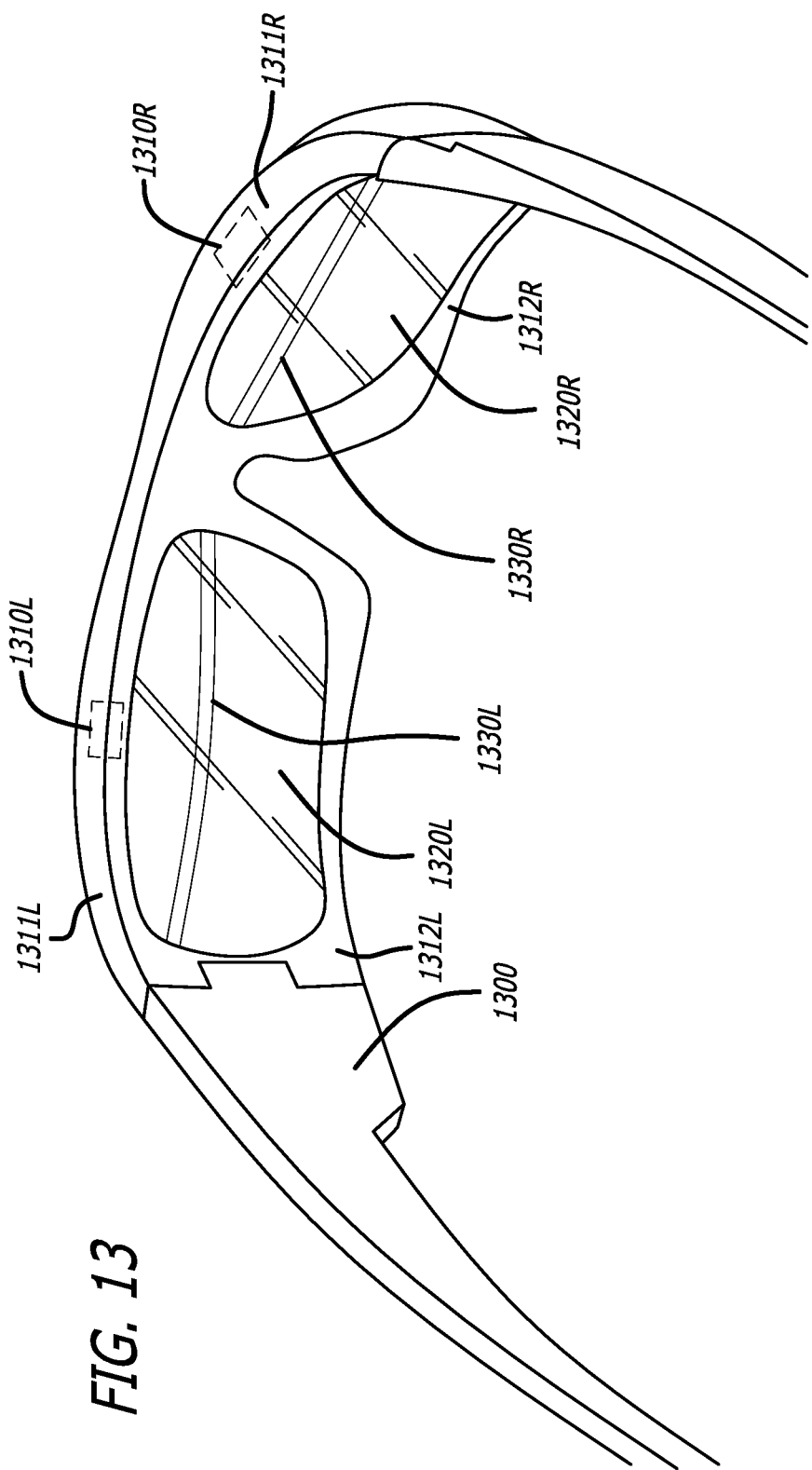
FIG. 13 illustrates an example for explaining a see-through near-eye display system according to an embodiment herein.

FIG. 13 shows one embodiment of the present disclosure. In this embodiment, the lens prism assembly 1320L and 1320R for the left eye and right eye respectively are supported by a holding assembly 1300 which may be in the form of a conventional eyeglass frame. The holding device 1300 may be designed to resemble a conventional eyeglass frame but other styles are enabled. Display devices 1310L and 1310R can be disposed at the first upper edges 1311R and 1311L of 1320L and 1320R as shown in FIG. 13, but may be disposed at the second lower edges 1312R and 1312L of 1320L and 1320R as well, or any combination of first edge or second edge device positions may be employed.

Except for the embedded beam-splitting surfaces 1330L and 1330R, the lens prism assemblies 1320L and 1320R resemble and function in the transmission of light received from the real-world view as a pair of ophthalmic lenses and may be provided with or without vision correction. Other components like computers, sensors, antenna, control circuit boards and batteries may also be incorporated into the holding frame assembly 1300 or alternatively, the display devices 1310L and 1310R can be connected to an external computer through wireless means or cables coming out of the two ends of the temples of the glasses frame. Because of the mirror symmetry relationship between the systems for the left eye and the right eye, only the right eye system is described in the following but use in binocular applications is contemplated as within the scope of the disclosure and the claims.

Figure 14:
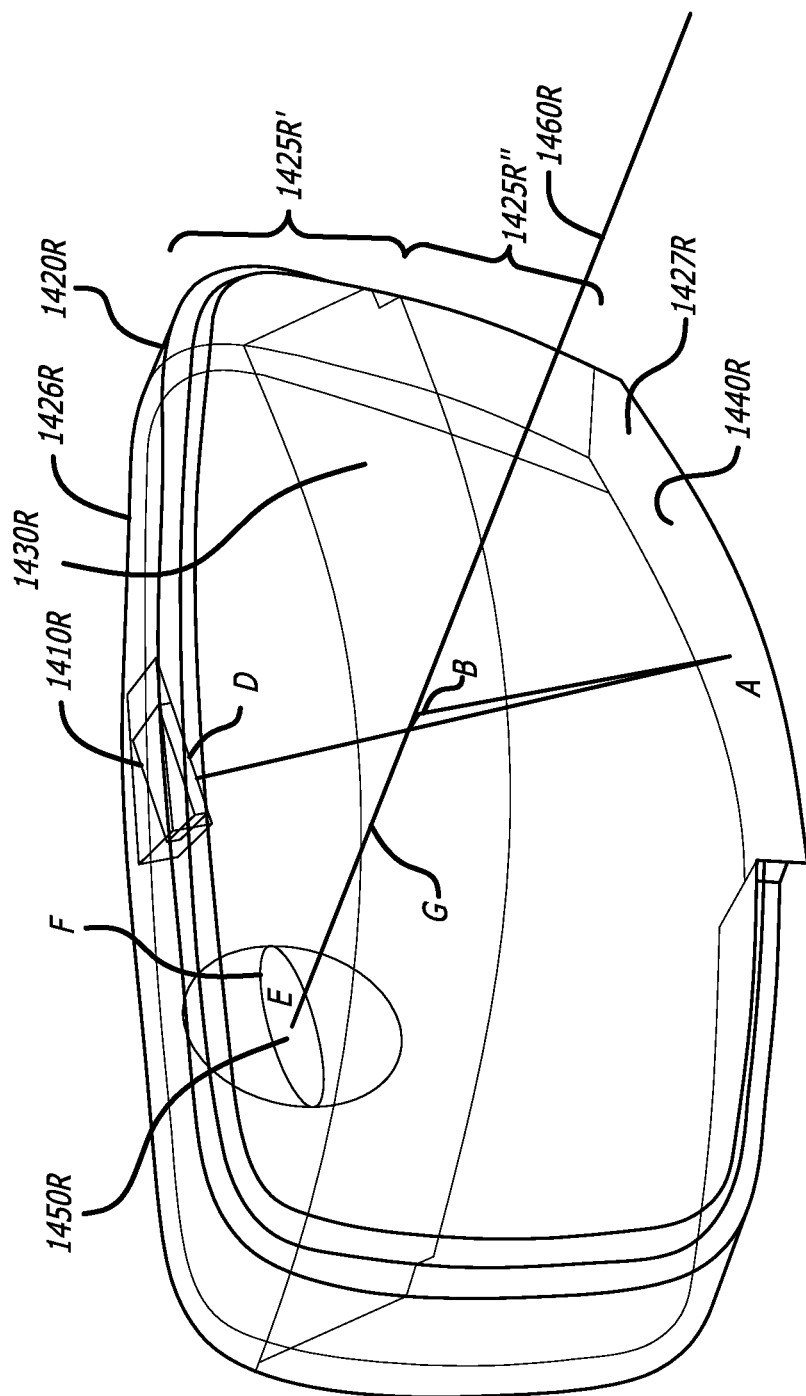
FIG. 14 illustrates an example for explaining a right eye channel of a see-through near-eye display system according to an embodiment herein.

FIG. 14 illustrates the lens prism assembly 1420R formed by an upper portion 1425R' and a lower portion 1425W' with 1430R noted as the beam-splitting element bonding interface of the two portions, according to one embodiment. The upper portion 1425R' on whose first edge 1426R the display device 1410R is disposed has a partially-reflective coating applied on its interface 1430R with lower portion 1425R" to define a beam-splitting element. The lower portion 1425R" is provided with a reflective surface 1440R disposed on its second edge 1427R. The large plane feature of interface 1430R can have a transmittance of about 80% and a reflectance of about 20% but any suitable user-defined transmittance/reflectance ratio may be selected. This can be achieved for instance by use of a metal coating or dielectric thin film coating as is known in the optical art. The scene-facing and viewer-facing surfaces of upper portion 1425R' and the lower portion 1425R" can be aligned with each other and bonded together with an index-matching optical cement. It is desirable that any misalignment between scene-facing and viewer-facing surfaces of the lens prism assembly 1420R be smaller than 0.1 mm after bonding to minimize or avoid artifacts in the transmission of the real-world view to the user.

FIG. 14 illustrates a ray path from D, the center of display device 1410R, through the lens prism assembly 1420R, to E, the eye pupil plane 1450R, according to one embodiment. The line EG 1460R is the vision line when the right eye is looking straight ahead at infinity or at a plane located greater than two meters away. As the light ray leaves the display device center D, it travels down the lens thickness of upper portion 1425R' of the lens prism assembly 1420R, transmits through the interface 1430R, to lower portion 1425R" and incident at A on the reflective element 1440R. Upon reflection from 1440R, the ray travels back to intercept the interface 1430R at B. The ray is then reflected toward G on the viewer-facing surface of the lens prism assembly 1420R. After transmission through the viewer-facing surface, the ray enters the viewer's eye pupil at E along vision line direction 1460R. The information in the form of an optical image received from display device 1410R is then perceived as superimposed upon the real-world view along vision line 1460R.

FIG. 14 also shows the elliptical beam footprint F at the eye pupil plane for light transmitted from a point on the display device. The horizontal dimension of the beam foot print F is several times larger than its vertical dimension. This is the result of the horizontal dimension of the lens prism assembly 1420R being larger than its dimension along the vision line 1460R direction. However, this may not reduce the performance of the NED of the embodiments of the disclosure. Although a relatively large horizontal beam footprint can accommodate the variation of IPD among the user population and the left and right sweeping of the eye pupil of a user, the smaller vertical beam footprint is compensated by adjusting the position of the eyeglass frame on user's nose ridge and its effect further minimized by the fact the general population of humans tend to tilt their head back and forth to view in the vertical direction instead of moving their eyes in vertical dimension.

Earlier attempts have been made at making the vertical dimension of the beam footprint as large as the horizontal dimension. The resulting systems can be bulky and/or complicated. On the other hand, the optical system of the present disclosure beneficially has most of its optical power contributed by the reflective element 1440R which may be centered relative to the display device 1410R. In one embodiment, reflective element 1440R can be provided as a weak toroidal surface with small difference in curvature radius along two orthogonal directions. This departure from the rotational symmetry of reflective surface 1440R accounts for the fact that the viewer-facing surface of the lens prism assembly 1420R may be provided to have a different curvature radius along two orthogonal directions.

Although the viewer-facing surface of lens prism assembly 1420R may be generally of toroidal shape and tilted with respect to the vision line 1460R, the information rays as focused by 1440R have low divergence at the viewer-facing surface and form moderate angles with respect to the vision line 1460R. In addition, the curvature radius on the scene-facing surface and viewer-facing surface of the lens prism assembly 1420R is not strong for practical reasons and all of these features combine to provide an acceptable aberration level and good optical performance.

Figure 15:
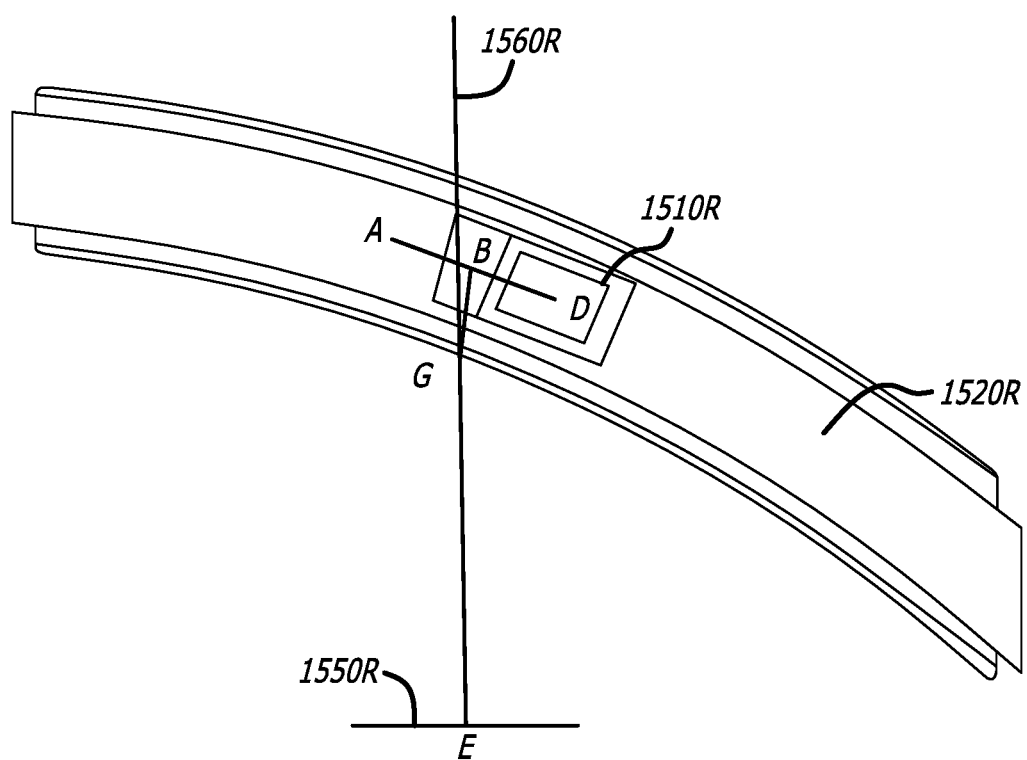
FIG. 15 illustrates an example for explaining a horizontal view of a right eye channel of a see-through near-eye display system according to an embodiment herein.

FIG. 15 shows the horizontal view of the ray path from D center of a display device 1510R to the center E of eye pupil 1550R for the lens prism assembly 1520R, according to one embodiment. In this embodiment, the line GE and its extension defines the vision line 1560R. For fashion, compactness, or the need of vision correction, the scene-facing surface and viewer-facing surface of lens prism system 1520R is generally curved and tilted relative to vision line 1560R as shown in FIG. 15. As a result, ray path DABGE does not lie within a single plane but lays in a 3D space. The NED imaging system of the disclosure is thus generally tilted without any symmetry plane. However, the imaging system can still be considered a quasi-axial one relative to the center ray as discussed above. In contrast to off-axis systems as disclosed in prior art patent literature, the quasi-axial system of the present disclosure has the advantage of easy fabrication and good optical performance. Also, in contrast to prior art on-axis systems as disclosed in prior art patent literature, the quasi-axial system of the present disclosure has the advantage of compactness and aesthetics.

Figure 16A:
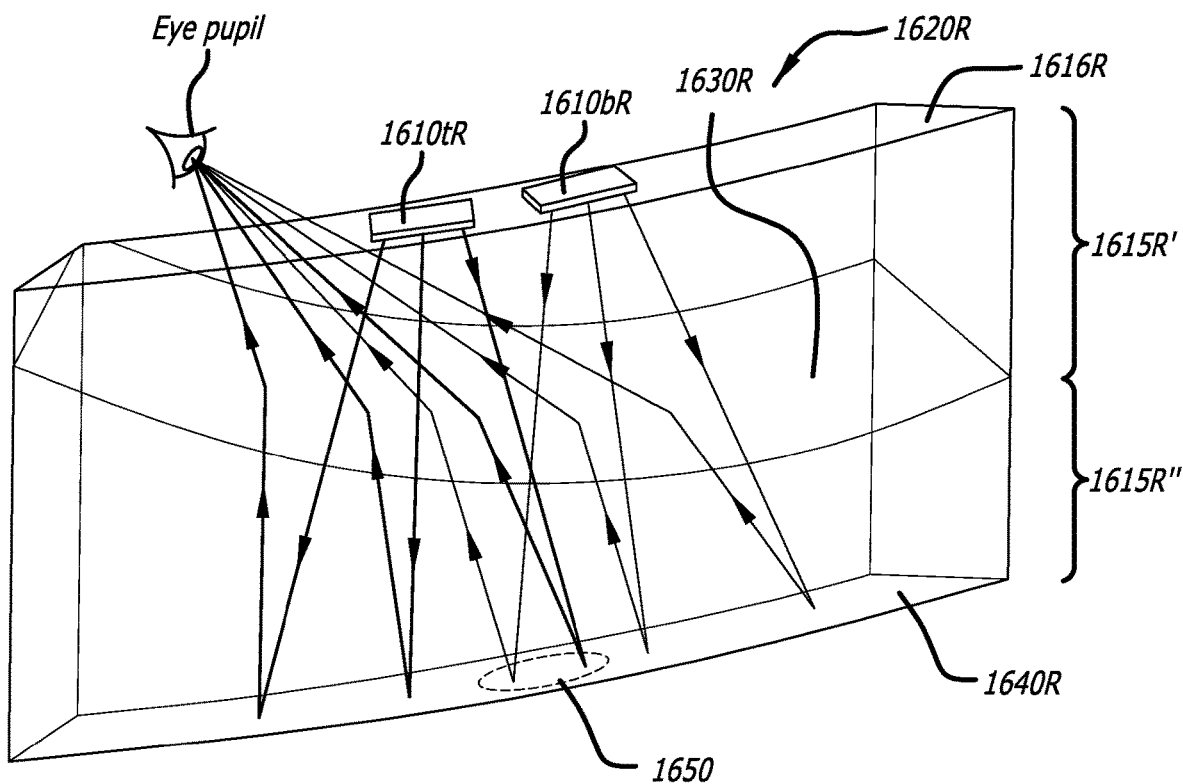
FIG. 16A illustrates an example for explaining a right eye FOV tiling see-through near-eye display system according to an embodiment herein.
Figure 16B:
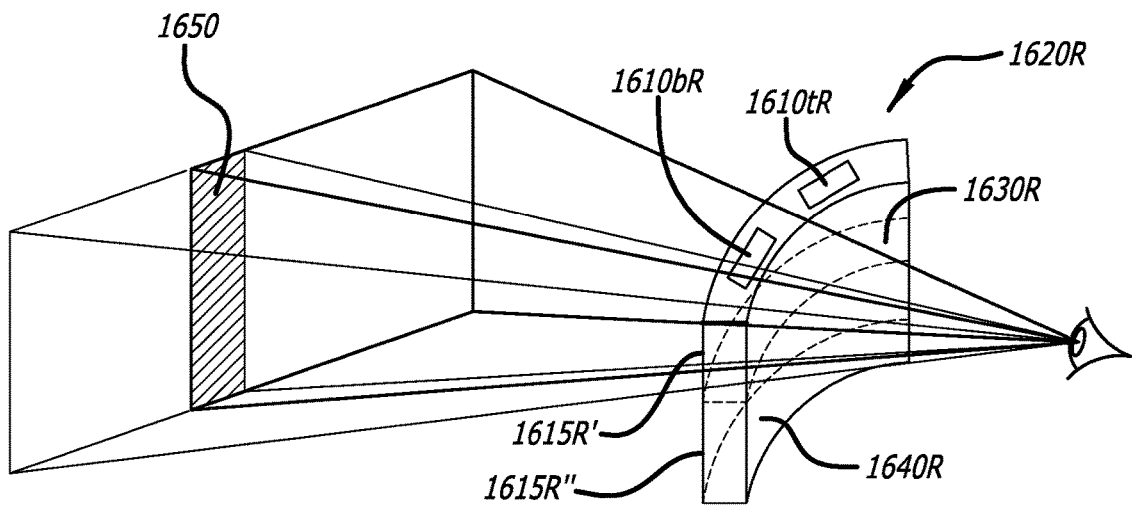
FIG. 16B illustrates a second example for explaining a right eye FOV tiling see-through near-eye display system according to an embodiment herein.

FIGS. 16A and 16B show example optics for the right eye of an embodiment of the present disclosure in which two display devices are disposed side-by-side to extend the horizontal FOV from that of a single display device NED. In FIGS. 16A and 16B, the right eye optics assembly 1620R are formed by an upper portion 1615R' and a lower portion 1615R" with 1630R identified as the bonding interface of the two respective portions that defines a beam-splitting element. The upper portion 1615R' on whose first upper edge 1616R the display devices 1610tR and 1610bR are disposed can be provided with a partially-reflective coating applied on its interface 1630R to lower portion 1615R". The partially-reflective coating on 1630R of the upper portion 1615R' can have a transmittance of about 80% and a reflectance of about 20% but other ratios may be implemented. This can be achieved for instance by use of a metal coating or dielectric thin film coating as is known in the optical arts. The scene-facing surface and viewer-facing-surface of upper portion 1615R' and the lower portion 1615W' can be aligned with each other and bonded using an index-matching optical cement applied on the bonding interface 1630R. It is desirable for the misalignment between scene-facing surface and viewer-facing-surface of the lens prism assembly to be less than about 0.1 mm after bonding to minimize or avoid artifacts in the transmission of the real-world view to the user.

FIG. 16A also shows chief ray paths from the center and four corners of display devices 1610tR and 1610bR, through the lens prism assembly 1620R, all the way to the eye pupil plane, according to one embodiment. As the rays leave the display devices, they travel through the thickness of lens prism assembly 1620R and straight down through upper portion 1615R' of the lens prism assembly 1620R, partially transmit through the interface 1630R to enter the lower portion 1615R" and are incident upon the reflective element 1640R. Minute prismatic features are provided on 1640R similar to those of a Fresnel mirror on a flat substrate. These prismatic features may be configured to impart optical power to the otherwise flat substrate surface and perform a role in imaging the output of the display devices to the eye. Upon reflection from 1640R, the rays travel back to intercept interface 1630R. They are then partially-reflected by 1630R and exit the lens prism assembly 1620R toward the eye through the viewer-facing surface. The optical information coupled from display devices 1610tR and 1610bR is perceived as superimposed upon the real-world view. There may also be prismatic features disposed on the 1630R interface configured so that rays from either 1610tR or 1610bR are directed toward the eye pupil by an otherwise plane-like feature. As shown in FIGS. 16A and 16B, there may be an overlap 1650 of light paths from display devices 1610tR and 1610bR which overlap is accommodated by the prismatic features.

Figure 17:
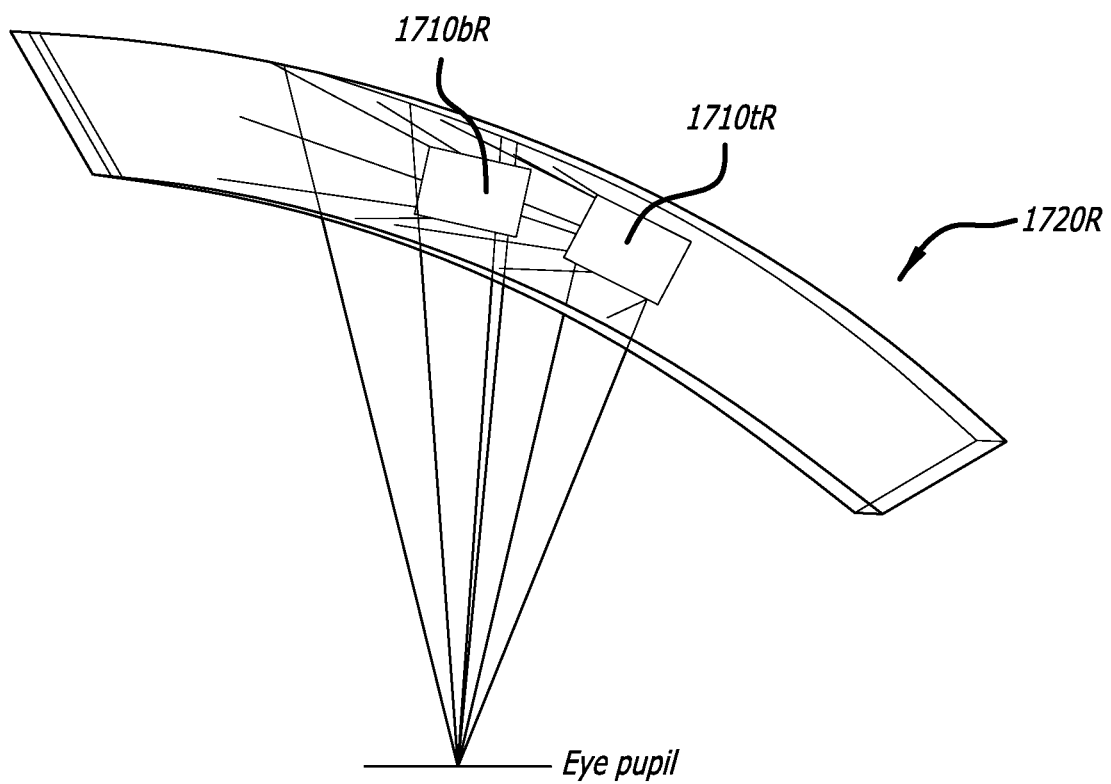
FIG. 17 illustrates an example for explaining a horizontal view of a right eye FOV tiling see-through near-eye display system according to an embodiment herein.

FIG. 17 shows the horizontal view of chief ray paths from the center and corner points on display devices 1710bR and 1710tR to the center of eye pupil for right eye lens prism assembly 1720R, according to one embodiment. The FOV contributed by each display device combines to form a large FOV with a minimal overlap. Due to the employment of micro-prismatic features on the embedded beam-splitter element interface 1630R and reflective element 1640R of FIG. 16A, the interlacing of light from either display device over the eye pupil plane is on a micro-scale and image gaps or other directional artifacts are not observed during eye movement. For fashion, compactness, or the need of vision correction, the scene-facing surface and viewer-facing-surface of lens prism assembly 1720R is generally curved, tilted and without a symmetry plane. However, the break of symmetry is gentle due to the major imaging path segment from each display device to its corresponding Fresnel prismatic features on reflective element 1640R having rotational symmetry around the normal axis at the center of the respective display device. In contrast to off-axis systems as disclosed in prior art, the quasi-axial system of the present disclosure has the advantage of easy fabrication and good optical performance. Also, the optical interlacing of micro-prismatic features for different display devices permits a large overlap of light paths from different display devices, resulting in a reduction of system volume.

Figure 18A:
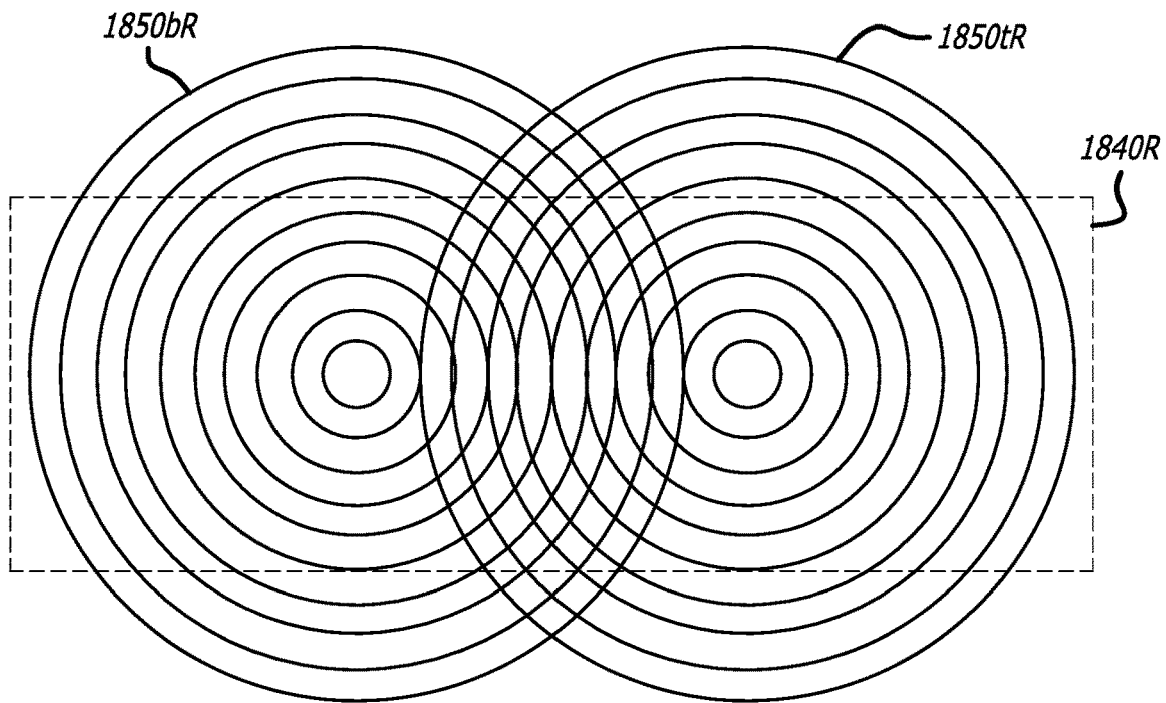
FIG. 18A illustrates an example for explaining two overlapped Fresnel mirrors with optical power according to an embodiment herein.

FIG. 18A shows an example use of overlapped Fresnel mirrors 1850bR and 1850tR on the lower second edge 1840R of the exemplar right eye NED optics, according to one embodiment. Each Fresnel mirror can be provided with concentric circular micro-prismatic features whose centers are approximately aligned with those of the respective display devices. Such alignment can ensure higher optical performance.

Figure 18B:
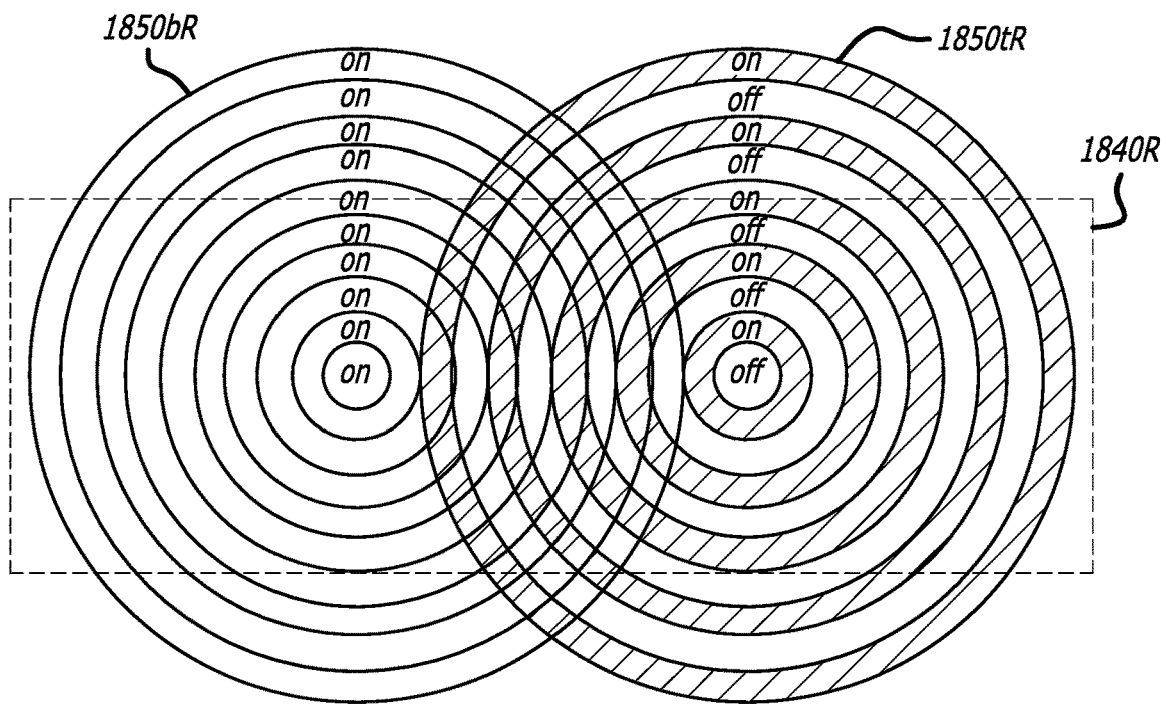
FIG. 18B illustrates an example for explaining spatially-multiplexed Fresnel mirrors with optical power according to an embodiment herein.

FIG. 18B shows the interlacing of prismatic features from 1850bR and 1850tR by eliminating alternating selected concentric prismatic features of 1850tR, according to one embodiment. Selected concentric prismatic features for 1850tR may not be provided while all concentric features for 1850bR are. In this embodiment, the display device for 1850bR is perceived as less bright than the other device but the loss of brightness is compensated by the display device like the QPI imager. The advantage in system volume reduction resulting from this overlap approach is substantial. It is noted that, similarly, the alternative features on 1850bR may be eliminated with all features on 1850tR being on.

Figure 18C:
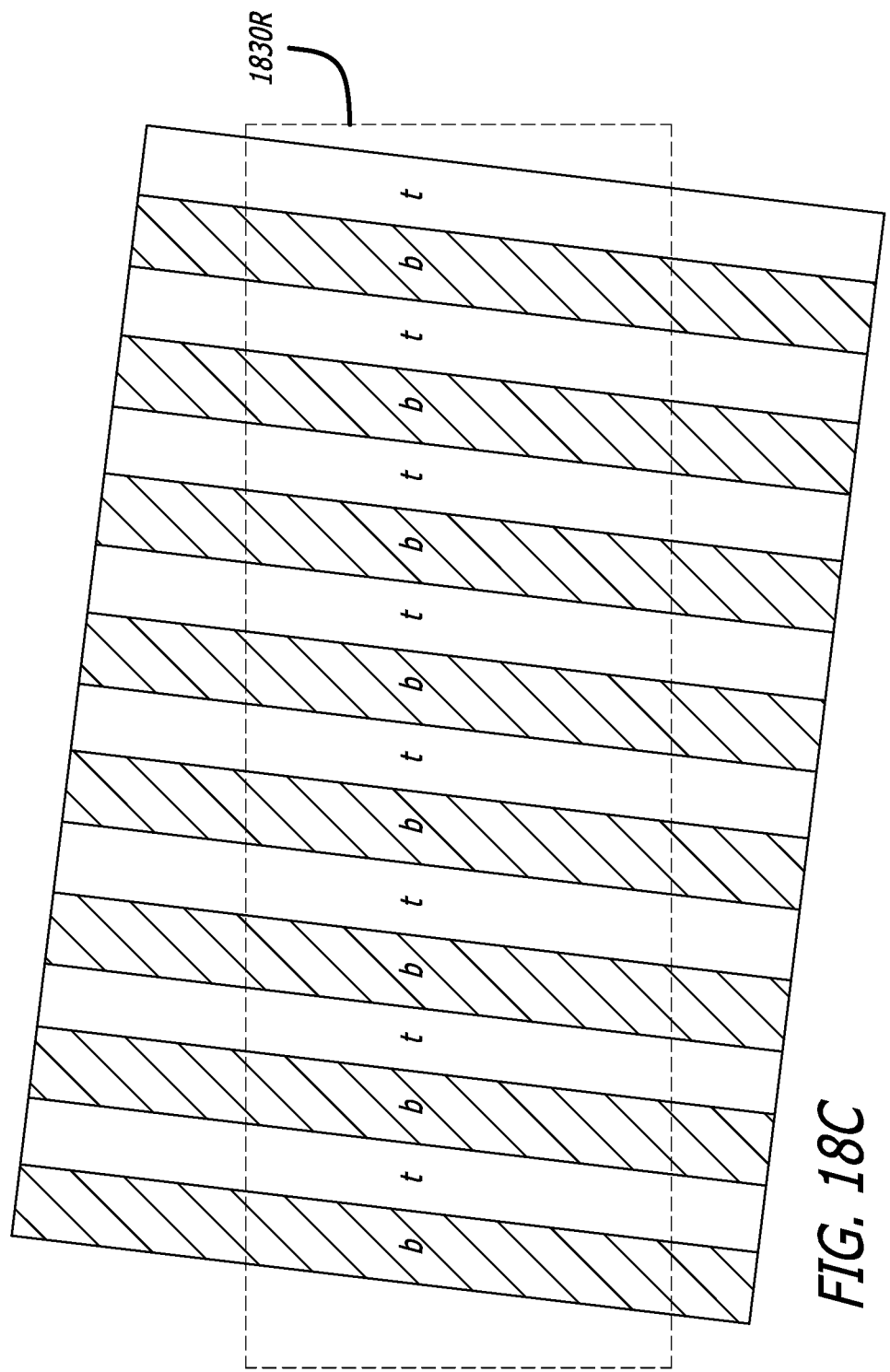
FIG. 18C illustrates an example for explaining spatially-multiplexed Fresnel mirrors without optical power according to an embodiment herein.

FIG. 18C shows the micro-prismatic features on the embedded beam-splitting element interface 1830R of the example right eye NED optics, according to one embodiment. Since there is no optical power on the interface 1830R, the prismatic features may be generally linear in contour.

The prismatic features are alternating for either of the display devices as designated by b or t as shown in FIG. 18C.

Figure 19:
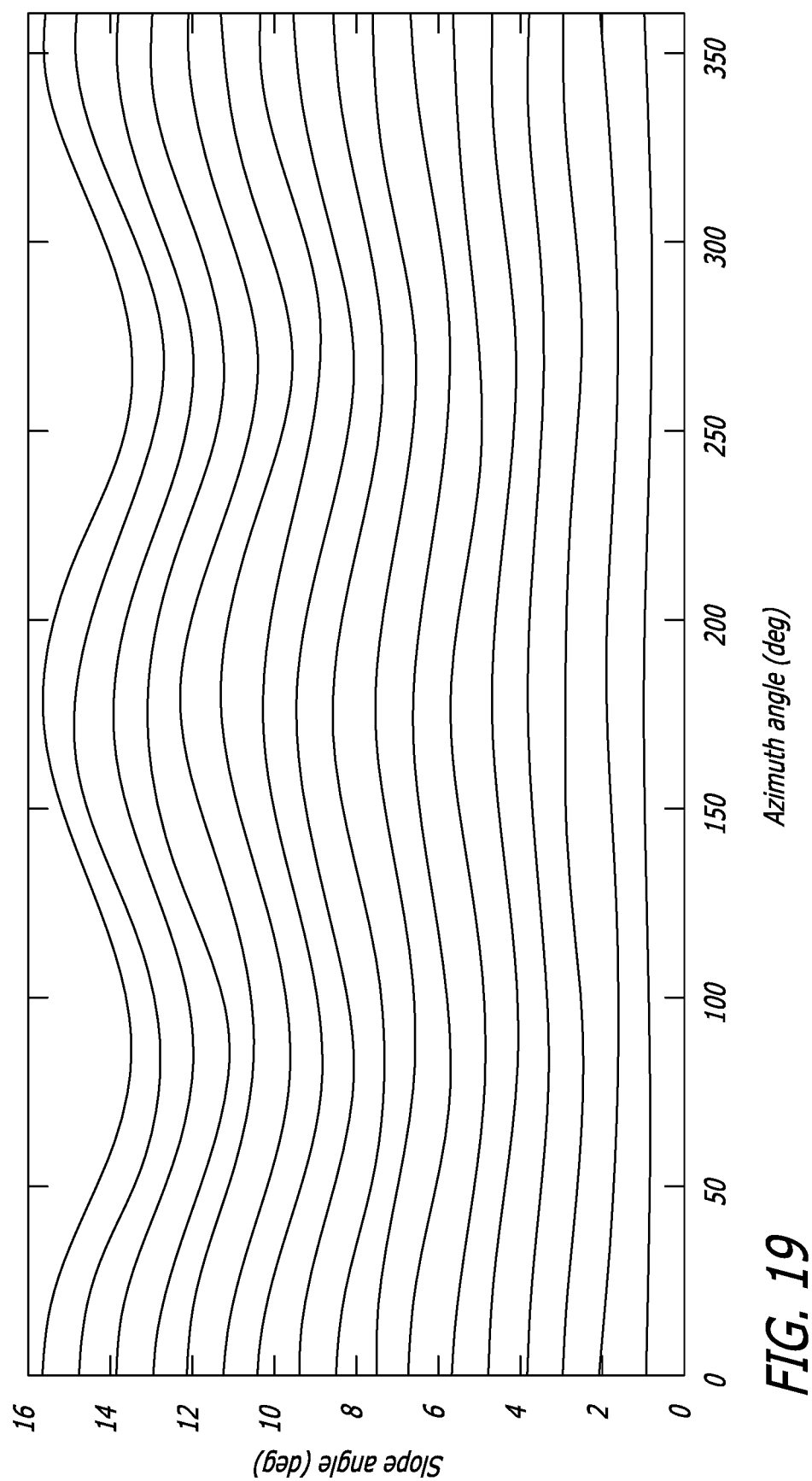
FIG. 19 illustrates an example for explaining angular prismatic facet elements in a Fresnel mirror according to an embodiment herein, to implement a free-form optical surface.

For a given symmetrical optical surface, its equivalent Fresnel surface has concentric circular features with a constant slope angle. Optical power is imparted by providing a predetermined variation of slope angle across the various circular features. In a tilted optical system of the disclosure, a free-form optical surface may be used for aberration correction. A simple method to implement a free-form surface in the Fresnel type lens disclosed herein is to modulate the slope angle periodically at predetermined periods along the azimuth direction on a circle. An embodiment comprising the above approach is depicted in FIG. 19. Each curve represents a concentric circle of a Fresnel prism element at a certain radius. In this example, the slope angle and the contouring magnitude increase as the circle radius increases. This type of free-form Fresnel optics assists in balancing aberrations that may be introduced by slight symmetry break in NED for compactness and aesthetics.

Figure 20A:
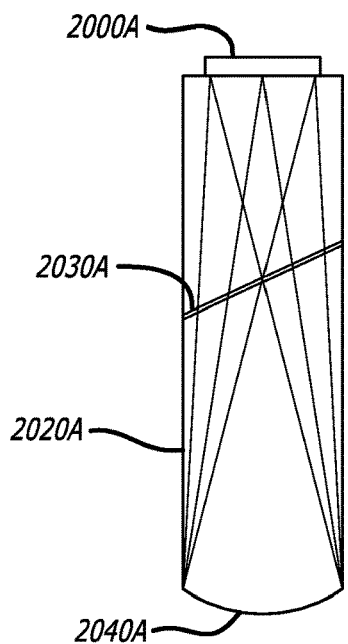
FIG. 20A illustrates an example for explaining a non-telecentric display element incorporated into a near-eye optical system having a flat lens according to an embodiment herein.
Figure 20B:
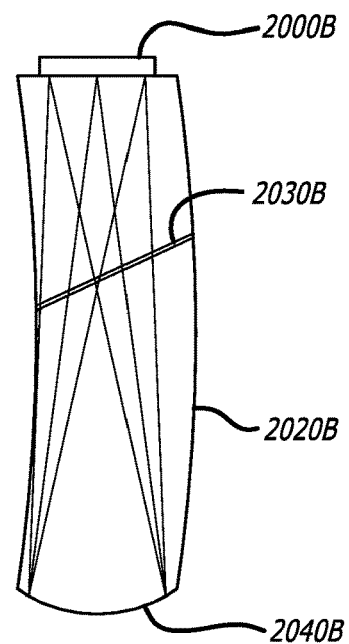
FIG. 20B illustrates an example for explaining a non-telecentric display element incorporated into a near-eye optical system having a curved lens according to an embodiment herein.

Turning to FIGS. 20A and 20B, embodiments involving reduction of "ghost" images are now discussed. By way of background, undesirable "ghost" images are typically generated in optical systems due to reflections off of the lens element that are visible in the eye-box of the system. Such reflections and the ghost images they cause are avoided in the flat and curved optical lens embodiments illustrated in FIGS. 20A and 20B by using "non-telecentric" emission display elements 2000A and 2000B. Examples of non-telecentric display elements suitable for use in these embodiments are disclosed in U.S. patent application Ser. No. 15/391,583, filed Dec. 27, 2016, entitled "Non-Telecentric Emissive Micro-Pixel Array Light Modulators and Methods of Fabrication Thereof", the entirety of which is incorporated herein by reference.

In the non-telecentric embodiments disclosed herein, the respective pixels of each of display elements 2000A and 2000B are provided with an associated array of pixel-level micro optical elements (pixel-level micro lens array or "PMLA") that is configured to collimate light emitted from each pixel to match a reflector optical aperture. Each pixel element is configured to direct the light emitted from the pixel toward the reflector optical aperture by means of the associated PMLA micro optical element. The individual light emission from each pixel is thus directionally modulated by the PMLA in a unique direction to enable a predetermined non-telecentric pixel light emission pattern from the pixel array of non-telecentric display element 2000.

In one aspect, the PMLA layer of pixel-level micro optical elements is disposed above the pixels and is used to directionally modulate light coupled onto the PMLA micro optical elements from the corresponding pixels in a predetermined respective direction relative to an axis that is perpendicular to the surface of non-telecentric display element 2000A or 2000B.

Non-telecentric display element 2000A or 2000B may be incorporated into either a flat lens element design (as shown in FIG. 20A) or a curved lens element design (as shown in FIG. 20B) of a near-eye optical system. The flat lens element design may include a flat lens prism assembly 2020A, embedded beam-splitting surface 2030A, and reflective surface 2040A. The curved lens element design may include a curved prism assembly 2020B, embedded beam-splitting surface 2030B, and reflective surface 2040B. In these embodiments, the light emitted from each pixel is substantially coupled to the reflector's optical aperture with minimal light ray scattering toward the lens viewing surface and with minimal reflection toward the viewing eye-box that can result in undesired ghost images. It is therefore possible to reduce "ghost" images by virtue of the arrangements in FIGS. 20A and 20B.

Figure 21:
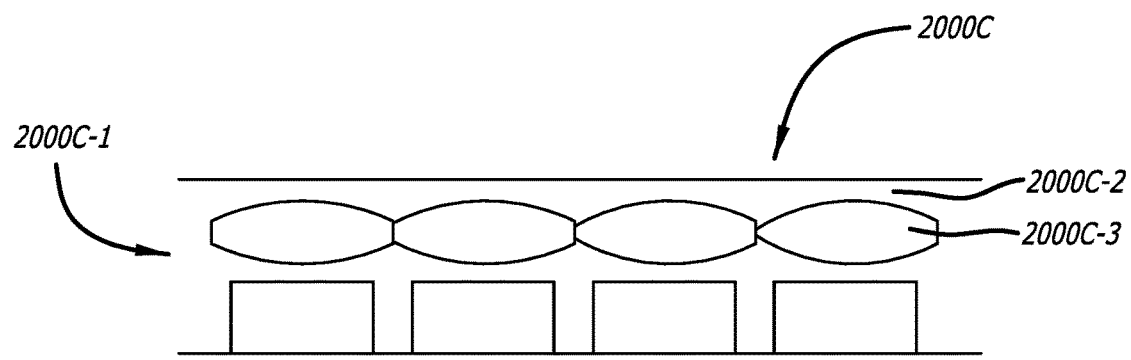
FIG. 21 illustrates an example for explaining a non-telecentric display element incorporated into a near-eye optical system, the non-telecentric display element being comprised of refractive optical elements according to an embodiment herein.

FIG. 21 illustrates an example non-telecentric display element 2000C for use with a near-eye display system, in which individual non-telecentric micro optical elements making up PMLA 2000C-1 are realized as refractive optical elements (ROE) and are used to direct selected pixel light outputs at angles generally inclined relative to the surface of non-telecentric display element 2000C.

In the embodiment of FIG. 21, directional modulation of the pixel-level refractive non-telecentric micro optical elements are realized using de-centered micro lenses formed by successive low and high refractive index layers of dielectric materials 2000C-2 and 2000C-3, each having different indexes of refraction. FIG. 21 is a schematic cross-section of non-telecentric display element 2000C comprising an array 2000C-1 of non-telecentric refractive micro optical elements. In this embodiment, array 2000C-1 of pixel-level non-telecentric micro optical elements may be fabricated monolithically at the wafer level as multiple layers of semiconductor dielectric material, such as silicon oxide for low index layer 2000C-2 and silicon nitride for high index layer 2000C-3, using known semiconductor lithography, etch and deposition techniques. As illustrated in FIG. 21, array 2000C-1 of pixel-level micro optical elements are realized using multiple layers; the dielectric materials 2000C-2 and 2000C-3 having different indexes of refraction are successively (sequentially) deposited to form the refractive surfaces of pixel-level micro optical elements, each of which progressively vary in refractive micro-lens element center position across array 2000C-1 as required to obtain the desired non-telecentric characteristics and image projection directions.

Figure 22:
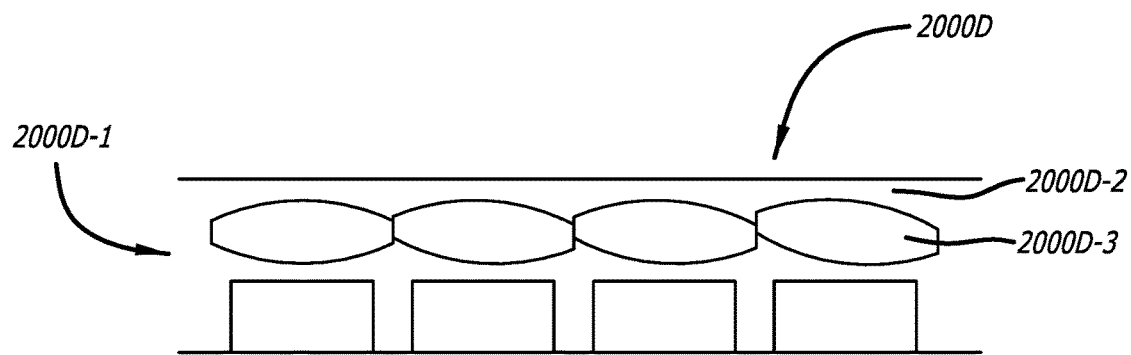
FIG. 22 illustrates an example for explaining a non-telecentric display element incorporated into a near-eye optical system, the non-telecentric display element being comprised of tilted refractive optical elements according to an embodiment herein.

FIG. 22 illustrates an example of a non-telecentric display element 2000D in which the array 2000D-1 of non-telecentric micro optical elements are realized as tilted refractive optical elements (ROE), again progressively varying across array 2000D-1 to obtain the desired non-telecentric characteristics and image projection directions, and may be used to direct selected pixel light outputs at angles generally inclined relative to the surface of non-telecentric display element 2000D. In this embodiment, and as best illustrated in FIG. 22, directional modulation of the pixel-level refractive non-telecentric micro optical elements is realized using "tilted" micro lenses that are formed by successive layers of dielectric materials 2000D-2 and 2000D-3, each having different indexes of refraction.

FIG. 22 is a side view of non-telecentric display element 2000D comprising a plurality of tilted refractive micro optical elements. In this embodiment, array 2000D-1 of pixel-level non-telecentric micro optical elements may be fabricated monolithically at the wafer level as multiple layers of semiconductor dielectric materials, such as silicon oxide for low index layer 2000D-2 and silicon nitride for high index layer 2000D-3, using known semiconductor lithography, etch and deposition techniques. As illustrated in FIG. 22, array 2000D-1 may be realized using multiple layers dielectric materials 2000D-2 and 2000D-3 with different indexes of refraction successively (sequentially) deposited to form the refractive surfaces of the pixel-level non-telecentric micro optical elements that comprise array 2000D-1.

Non-telecentric display elements 2000C and 2000D may each comprise refractive or diffractive micro optical elements which may be fabricated from a UV curable polymer. The diffractive micro optical elements of non-telecentric display elements 2000C and 2000D may each comprise blazed gratings or rail gratings. Blazed gratings used in the non-telecentric display element may be configured whereby the directional modulation of the pixel outputs is determined at least in part by a slant angle, a pitch or both a slant angle and a pitch, of the blazed grating elements.

Many alterations and modifications may be made by those having ordinary skill in the art without departing from the spirit and scope of the disclosure. Therefore, it must be understood that the illustrated embodiment has been set forth only for the purposes of example and that it should not be taken as limiting the disclosure as defined by any claims in any subsequent application claiming priority to this application.

For example, notwithstanding the fact that the elements of such a claim may be set forth in a certain combination, it must be expressly understood that the disclosure includes other combinations of fewer, more or different elements, which are disclosed in above even when not initially claimed in such combinations.

The words used in this specification to describe the disclosure and its various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a subsequent claim must be understood as being generic to all possible meanings supported by the specification and by the word itself.

The definitions of the words or elements of any claims in any subsequent application claiming priority to this application should be, therefore, defined to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements in such claims below or that a single element may be substituted for two or more elements in such a claim.

Although elements may be described above as acting in certain combinations and even subsequently claimed as such, it is to be expressly understood that one or more elements from a claimed combination can in some cases be excised from the combination and that such claimed combination may be directed to a subcombination or variation of a subcombination.

Insubstantial changes from any subsequently claimed subject matter as viewed by a person with ordinary skill in the art, now known or later devised, are expressly contemplated as being equivalently within the scope of such claims. Therefore, obvious substitutions now or later known to one with ordinary skill in the art are defined to be within the scope of the defined elements.

Any claims in any subsequent application claiming priority to this application are thus to be understood to include what is specifically illustrated and described above, what is conceptually equivalent, what can be obviously substituted and also what essentially incorporates the essential idea of the disclosure.

What is claimed is:

1. A near-eye display device having an elongated eye box with a horizontal dimension that is larger than its vertical dimension, the near-eye display device comprising:
    a supporting frame that mounts the near-eye display device on a user's face;
    a spectacle lens mounted on the supporting frame through which the real world is viewed, the spectacle lens including a view-facing surface and a scene-facing surface; and
    two or more image display devices disposed at an upper edge of the spectacle lens or at a lower edge of the spectacle lens, each image display device projecting light from the image display device into an eye of a user, wherein the two or more image display devices each comprise a directional modulation layer including at least one pixel-level micro-optical element, comprising one or more semiconductor dielectric materials, configured to directionally modulate a light coupled onto the pixel-level micro-optical element from a corresponding pixel to a respective direction relative to an axis perpendicular to a surface of the display element.

2. The near-eye display device of claim 1, wherein each image display device covers a field of view zone, and wherein the field of view zones are stacked to achieve a larger field of view.

3. The near-eye display device of claim 1, wherein the spectacle lens is composed of a top portion and a bottom portion, the top portion and the bottom portion bonded together at a common interface surface.

4. The near-eye display device of claim 3, wherein the upper edge is included in the top portion of the spectacle lens and the lower edge is included in the bottom portion of the spectacle lens,
    wherein the two or more image display devices are disposed on the upper edge of the top portion, and
    wherein a reflective portion is disposed on the lower edge of the bottom portion, the reflective portion to focus light from each of the image display devices.

5. The near-eye display device of claim 4, wherein the reflective portion partially transmits and reflects light from different image display devices toward the eye box of the near-eye display.

6. The near-eye display device of claim 1, wherein the pixel-level micro optical element comprises a refractive micro optical element.

7. The near-eye display device of claim 1, wherein the pixel-level micro optical element comprises a diffractive micro-optical element.

8. The near-eye display device of claim 7, wherein the diffractive micro-optical element comprises a blazed grating or a rail grating.

9. The near-eye display device of claim 1, wherein a directional modulation of the pixel-level micro-optical element is determined by a slant angle or a pitch.

10. The near-eye display device of claim 1, wherein a directional modulation of the pixel-level micro-optical element is determined by a slant angle and a pitch.

11. The near-eye display device of claim 1, wherein a directional modulation of the pixel-level micro-optical element is determined by a blazed grating element.

12. The near-eye display device of claim 1, wherein the one or more semiconductor dielectric materials comprises multiple dielectric layers of silicon oxide or silicon nitride.

13. The near-eye display device of claim 1, wherein the directional modulation layer comprises a UV curable polymer.

* * * * *